United States Patent
Choi et al.

(10) Patent No.: US 11,985,690 B2
(45) Date of Patent: *May 14, 2024

(54) METHOD AND APPARATUS FOR ALLOCATING DYNAMIC RESOURCES OF INTEGRATED ACCESS AND BACKHAUL NODES IN WIRELESS COMMUNICATION SYSTEM

(71) Applicant: Samsung Electronics Co., Ltd., Gyeonggi-do (KR)

(72) Inventors: Seunghoon Choi, Gyeonggi-do (KR); Jinkyu Kang, Gyeonggi-do (KR); Youngbum Kim, Gyeonggi-do (KR); Taehyoung Kim, Gyeonggi-do (KR)

(73) Assignee: Samsung Electronics Co., Ltd (KR)

(*) Notice: Subject to any disclaimer, the term of this patent is extended or adjusted under 35 U.S.C. 154(b) by 0 days.

This patent is subject to a terminal disclaimer.

(21) Appl. No.: 18/144,567

(22) Filed: May 8, 2023

(65) Prior Publication Data

US 2023/0276477 A1  Aug. 31, 2023

Related U.S. Application Data

(63) Continuation of application No. 17/091,315, filed on Nov. 6, 2020, now Pat. No. 11,647,527.

(30) Foreign Application Priority Data

Nov. 8, 2019  (KR) .................. 10-2019-0142764

(51) Int. Cl.
*H04W 72/53* (2023.01)
*H04L 27/26* (2006.01)
(Continued)

(52) U.S. Cl.
CPC ......... *H04W 72/53* (2023.01); *H04L 27/2605* (2013.01); *H04W 72/0446* (2013.01);
(Continued)

(58) Field of Classification Search
CPC ............. H04W 72/04; H04W 72/0406; H04W 72/0413; H04W 72/042; H04W 72/044;
(Continued)

(56) References Cited

U.S. PATENT DOCUMENTS

2019/0349180 A1  11/2019  Lu
2019/0394687 A1  12/2019  Kowalski
(Continued)

FOREIGN PATENT DOCUMENTS

EP          3 771 279           1/2021
WO     WO 2019/194661      10/2019
(Continued)

OTHER PUBLICATIONS

Vivo, "Discussion on Resource Multiplexing Among Backhaul and Access Links", R1-1910210, 3GPP TSG RAN WG1 #98bis, Oct. 14-20, 2019, 9 pages.
(Continued)

*Primary Examiner* — Kevin D Mew
(74) *Attorney, Agent, or Firm* — The Farrell Law Firm, P.C.

(57) ABSTRACT

The disclosure relates to a communication method and system for converging a 5$^{th}$-Generation (5G) communication system for supporting higher data rates beyond a 4$^{th}$-Generation (4G) system with a technology for Internet of Things (IoT). The disclosure may be applied to intelligent services based on the 5G communication technology and the IoT-related technology, such as smart home, smart building, smart city, smart car, connected car, health care, digital education, smart retail, security and safety services. The
(Continued)

disclosure discloses a method and a device for allocating resources of an IAB node.

12 Claims, 9 Drawing Sheets

(51) Int. Cl.
*H04W 72/0446* (2023.01)
*H04W 72/23* (2023.01)
*H04W 88/14* (2009.01)
*H04L 5/00* (2006.01)

(52) U.S. Cl.
CPC ........... *H04W 72/23* (2023.01); *H04W 88/14* (2013.01); *H04L 5/0007* (2013.01)

(58) Field of Classification Search
CPC ......... H04W 72/0446; H04W 72/0493; H04W 88/06; H04W 88/14; H04L 27/2605; H04L 5/0007
See application file for complete search history.

(56) References Cited

U.S. PATENT DOCUMENTS

| | | | |
|---|---|---|---|
| 2019/0394738 A1 | 12/2019 | Abedini | |
| 2020/0015316 A1 | 1/2020 | Islam | |
| 2020/0053745 A1 | 2/2020 | Luo | |
| 2020/0145965 A1 | 5/2020 | Luo | |
| 2020/0145992 A1* | 5/2020 | Abedini | H04L 5/0064 |
| 2020/0145997 A1* | 5/2020 | Luo | H04W 16/02 |
| 2020/0146025 A1 | 5/2020 | Choi | |
| 2020/0146033 A1 | 5/2020 | Islam | |
| 2020/0252847 A1* | 8/2020 | Park | H04W 80/02 |
| 2020/0305166 A1* | 9/2020 | Abedini | H04W 72/53 |
| 2021/0014768 A1* | 1/2021 | Hong | H04W 40/22 |
| 2021/0022018 A1* | 1/2021 | Belov | H04L 5/001 |
| 2021/0105867 A1* | 4/2021 | Akkarakaran | H04W 64/00 |
| 2021/0144719 A1 | 5/2021 | Choi | |
| 2022/0116887 A1 | 4/2022 | Choi | |
| 2022/0232562 A1 | 7/2022 | Choi | |
| 2022/0232655 A1 | 7/2022 | Noh | |
| 2022/0376851 A1 | 11/2022 | Noh | |
| 2023/0057259 A1 | 2/2023 | Noh | |

FOREIGN PATENT DOCUMENTS

| | | | |
|---|---|---|---|
| WO | WO 2020/060143 | 3/2020 | |
| WO | WO 2020/092833 | 5/2020 | |
| WO | WO-2020196849 A1 * | 10/2020 | ......... H04B 7/15542 |
| WO | WO-2020198430 A1 * | 10/2020 | ........... H04W 72/042 |

OTHER PUBLICATIONS

LG Electronics, "Discussions on Resource Multiplexing among Backhaul and Access Links", R1-1910578, 3GPP TSG RAN WG1 #98bis, Oct. 14-20, 2019, 7 pages.
NTT DOCOMO, INC., "Mechanisms for Resource Multiplexing among Backhaul and Access Links", R1-1911166, 3GPP TSG RAN WG1 #98bis, Oct. 14-18, 2019, 10 pages.
Nokia et al., "Mechanisms for Resource Multiplexing among Backhaul and Access Links", R1-1911194, 3GPP TSG RAN WG1 Meeting #98bis, Oct. 14-20, 2019, 14 pages.
International Search Report dated Feb. 9, 2021 issued in counterpart application No. PCT/KR2020/015205, 7 pages.
AT&T, "Mechanisms for Supporting Access and Backhaul Link Multiplexing", R1-1909068, 3GPP TSG RAN WG1 #98, Aug. 26-30, 2019, 10 pages.
European Search Report dated Dec. 7, 2021 issued in counterpart application No. 20884574.3-1205, 13 pages.
Indian Notice of Hearing Report dated May 22, 2023 issued in counterpart application No. 202137028328, 2 pages.
Chinese Office Action dated Dec. 27, 2023 issued in counterpart application No. 202080019746.0, 19 pages.

* cited by examiner

METHOD AND APPARATUS FOR ALLOCATING DYNAMIC RESOURCES OF INTEGRATED ACCESS AND BACKHAUL NODES IN WIRELESS COMMUNICATION SYSTEM

CROSS-REFERENCE TO RELATED APPLICATION(S)

This application is a Continuation Application of U.S. patent application Ser. No. 17/091,315, filed on Nov. 6, 2020, in the United States Patent and Trademark Office, which is based on and claims priority under 35 U.S.C. § 119 to Korean Patent Application No. 10-2019-0142764, filed on Nov. 8, 2019, in the Korean Intellectual Property Office, the disclosure of which is incorporated by reference herein in its entirety.

BACKGROUND

1. Field

The disclosure relates generally to a wireless communication system, and more particularly to a method and apparatus for dynamic resource allocation of an integrated access and backhaul (IAB) node.

2. Description of Related Art

To meet the increased demand for wireless data traffic since the deployment of fourth generation (4G) communication systems, efforts have been made to develop an improved fifth generation (5G) or pre-5G communication system. Therefore, the 5G or pre-5G communication system is also called a "beyond 4G network" or a "post Long-Term Evolution (LTE) system". The 5G communication system is considered to be implemented in higher frequency (millimeter wave (mmWave)) bands, e.g., 60 gigahertz (GHz) bands, so as to accomplish higher data rates. To decrease propagation loss of the radio waves and to increase the transmission distance, beamforming techniques, massive multiple-input multiple-output (MIMO) techniques, full dimensional MIMO (FD-MIMO) techniques, array antenna techniques, analog beam forming techniques, and large scale antenna techniques are discussed in 5G communication systems. In addition, in 5G communication systems, development for system network improvement is under way based on advanced small cells, cloud radio access networks (RANs), ultra-dense networks, device-to-device (D2D) communication, wireless backhaul technology, moving network technology, cooperative communication technology, coordinated multi-points (CoMP) technology, and reception-end interference cancellation technology. In the 5G system, hybrid frequency-shift keying (FSK) and quadrature amplitude modulation (QAM) (FOAM) technology, sliding window superposition coding (SWSC) as an advanced coding modulation (ACM) technology, filter bank multi carrier (FBMC) technology, non-orthogonal multiple access (NOMA) technology, and sparse code multiple access (SCMA) as an advanced access technology have been developed.

The Internet is now evolving to the Internet of things (IoT) where distributed entities exchange and process information without human intervention. The Internet of everything (IoE), which is a combination of the IoT technology and big data processing technology through connection with a cloud server, has emerged. As technology elements, such as "sensing technology", "wired/wireless communication and network infrastructure", "service interface technology", and "security technology" have been demanded for IoT implementation, a sensor network, a machine-to-machine (M2M) communication technology, and a machine type communication (MTC) technology, have been researched recently. Such an IoT environment may provide intelligent Internet technology services that create a new value to human life by collecting and analyzing data generated among connected things. IoT may be applied to a variety of fields including smart homes, smart buildings, smart cities, smart or connected cars, smart grids, health care fields, smart appliances and advanced medical services through convergence and combination between existing information technology and various industrial applications.

Various attempts have been made to apply 5G communication systems to IoT networks. For example, technologies such as sensor network technologies, MTC technologies, and M2M communication technologies may be implemented by beamforming, MIMO, and array antennas. Application of a cloud RAN, as the above-described Big Data processing technology, may also be considered to be an example of convergence between the 5G technology and the IoT technology.

Additionally, various studies have been conducted to utilize the IAB technology, and accordingly, improvement in resource allocation of IAB nodes is also required.

SUMMARY

The present disclosure has been made to address the above-mentioned problems and disadvantages, and to provide at least the advantages described below.

In accordance with an aspect of the disclosure, a method performed by an IAB node including a distributed unit (DU) and a mobile termination (MT) is provided. The method includes receiving, by the MT from a base station, a message configuring at least one slot format for the MT; receiving, by the MT from the base station, downlink control information (DCI) including a slot format indicator indicating a slot format from the at least one slot format; and communicating, by the MT with a network node, in a slot based on the slot format indicated by the slot format indicator, wherein the slot includes 14 orthogonal frequency division multiplexing (OFDM) symbols with indexes from 0 to 13, wherein the slot format includes a beginning part including at least one uplink symbol, a middle part including at least one flexible symbol, and an end part including at least one downlink symbol, and wherein the slot format is identified from a first slot format group including 8 or more flexible symbols, a second slot format group including 9 or more uplink symbols, a third slot format group including 8 or more downlink symbols, or a fourth slot format group including 6 uplink symbols and 6 flexible symbols or 6 downlink symbols.

In accordance with another aspect of the disclosure, a method performed by a base station including a central unit (CU) and a DU is provided. The method includes transmitting, by the DU to an IAB node, a message configuring at least one slot format for an MT of the IAB node; transmitting, by the DU to the IAB node, DCI including a slot format indicator indicating a slot format from the at least one slot format; and communicating, by the DU with the IAB node, in a slot based on the slot format indicated by the slot format indicator, wherein the slot includes 14 OFDM symbols with indexes from 0 to 13, wherein the slot format includes a beginning part including at least one uplink symbol, a middle part including at least one flexible symbol, and an end part including at least one downlink symbol, and wherein the slot format is identified from a first slot format group including 8 or more flexible symbols, a second slot format group including 9 or more uplink symbols, a third slot format group including 8 or more downlink symbols, or a fourth slot format group including 6 uplink symbols and 6 flexible symbols or 6 downlink symbols.

In accordance with another aspect of the disclosure, an IAB node including a DU and an MT is provided. The IAB node includes a transceiver configured to transmit and receive a signal; and a controller configured to receive, by the MT from a base station, a message configuring at least one slot format for the MT, receive, by the MT from the base station, DCI including a slot format indicator indicating a slot format from the at least one slot format, and communicate, by the MT with a network node, in a slot based on the slot format indicated by the slot format indicator, wherein the slot includes 14 OFDM symbols with indexes from 0 to 13, wherein the slot format includes a beginning part including at least one uplink symbol, a middle part including at least one flexible symbol, and an end part including at least one downlink symbol, and wherein the slot format is identified from a first slot format group including 8 or more flexible symbols, a second slot format group including 9 or more uplink symbols, a third slot format group including 8 or more downlink symbols, or a fourth slot format group including 6 uplink symbols and 6 flexible symbols or 6 downlink symbols.

In accordance with another aspect of the disclosure, a base station including a CU and a DU is provided. The base station includes a transceiver configured to transmit and receive a signal; and a controller configured to transmit, by the DU to an IAB node, a message configuring at least one slot format for an MT of the IAB node, transmit, by the DU to the IAB node, DCI including a slot format indicator indicating a slot format from the at least one slot format, and communicate, by the DU with the IAB node, in a slot based on the slot format indicated by the slot format indicator, wherein the slot includes 14 OFDM symbols with indexes from 0 to 13, wherein the slot format includes a beginning part including at least one uplink symbol, a middle part including at least one flexible symbol, and an end part including at least one downlink symbol, and wherein the slot format is identified from a first slot format group including 8 or more flexible symbols, a second slot format group including 9 or more uplink symbols, a third slot format group including 8 or more downlink symbols, or a fourth slot format group including 6 uplink symbols and 6 flexible symbols or 6 downlink symbols.

BRIEF DESCRIPTION OF THE DRAWINGS

The above and other aspects, features, and advantages of certain embodiments of the present disclosure will be more apparent from the following description taken in conjunction with the accompanying drawings, in which.

DETAILED DESCRIPTION

Figure 1:
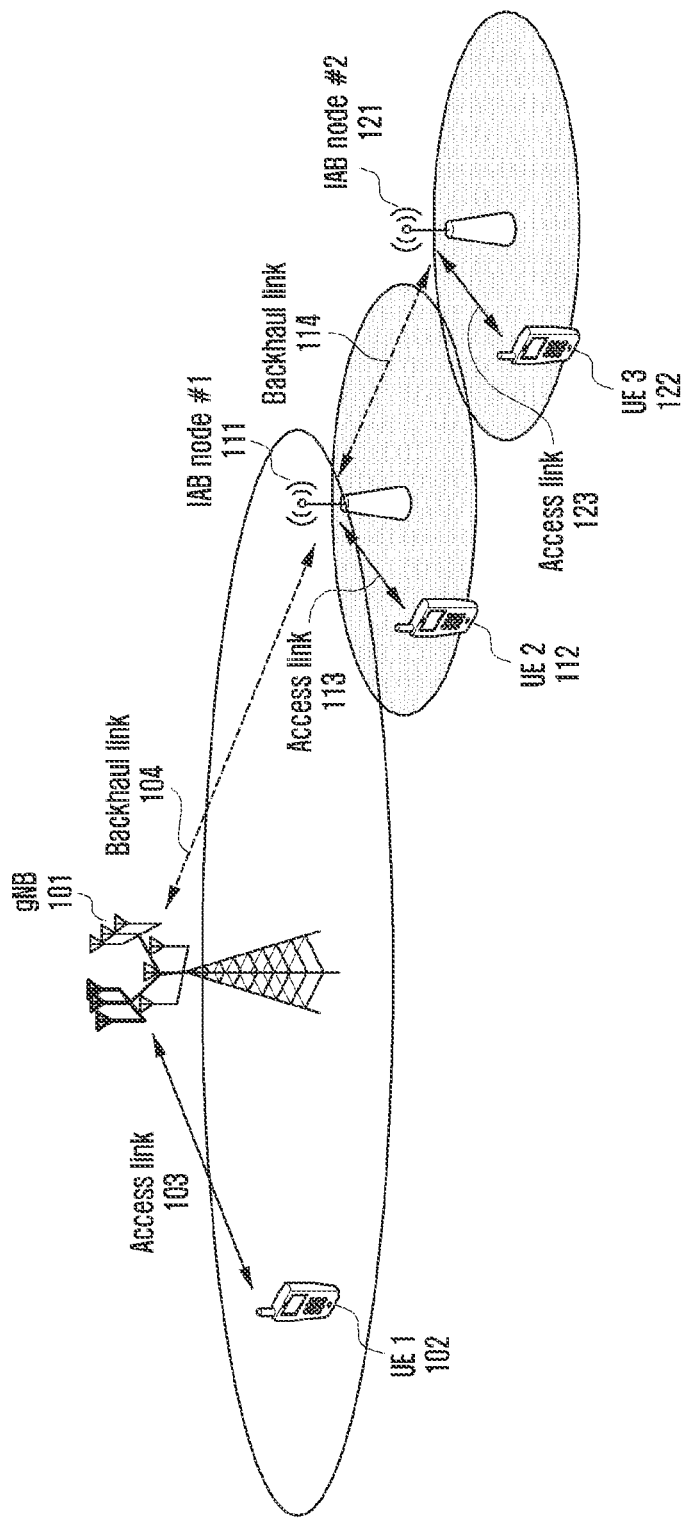
FIG. 1 is a view illustrating a communication system in which an IAB is operated, according to an embodiment.

The disclosure proposes a method for solving a problem that occurs when the transmission/reception directions of a DU and an MT in an IAB node do not match when the IAB is operated. In addition, the disclosure proposes a slot format for smooth operation of the IAB node.

According to embodiments of the disclosure, when the data transmission/reception directions of the DU and the MT of the IAB node do not match, the operation of the IAB node is defined according to a unidirectional transmission/reception characteristic, thereby preventing a problem that may occur in the IAB node. In addition, the IAB node can communicate efficiently based on the slot format proposed for operation of the IAB node.

Various embodiments of the disclosure are described in detail with reference to the accompanying drawings. However, in the accompanying drawings, the same or like elements are designated by the same or like reference numerals as much as possible. Further, a detailed description of known functions or configurations may be omitted.

In describing embodiments of the disclosure, descriptions related to technical contents well-known in the art and not associated directly with the disclosure may be omitted. Such an omission of unnecessary descriptions is intended to prevent obscuring the main idea of the disclosure.

For similar reasons, in the accompanying drawings, some elements may be exaggerated or schematically illustrated. Further, the size of each element may not completely reflect the actual size. In the drawings, identical or corresponding elements may be provided with identical reference numerals.

The advantages and features of the disclosure and ways to achieve them will be apparent by making reference to embodiments as described below in detail in conjunction with the accompanying drawings. However, the disclosure is not limited to the embodiments set forth below, but may be implemented in various different forms. The following embodiments are provided only to completely disclose the disclosure and inform those skilled in the art of the scope of the disclosure, and the disclosure is defined only by the scope of the appended claims. Throughout the specification, the same or like reference numerals designate the same or like elements.

Here, it will be understood that aspects of the present disclosure can be implemented by computer program instructions. These computer program instructions can be provided to a processor of a general purpose computer, special purpose computer, or other programmable data processing apparatus to produce a machine, such that the instructions, which can be executed via the processor of the computer or another programmable data processing apparatus, create a means for implementing the functions specified in the disclosure. These computer program instructions may also be stored in a computer usable or computer-readable memory that can direct a computer or other programmable data processing apparatus to function in a particular manner, such that the instructions stored in the computer usable or computer-readable memory produce an article of manufacture including instruction means that implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions, upon execution on the computer or other programmable apparatus, provide steps for implementing the functions specified in the disclosure.

Further, each block of the drawings may represent a module, segment, or portion of code, which includes one or more executable instructions for implementing the specified logical function(s). It should also be noted that in some alternative implementations, the functions noted in the disclosure may occur out of order.

As used herein, the term "unit" refers to a software element or a hardware element, such as a field programmable gate array (FPGA) or an application specific integrated circuit (ASIC), which performs a predetermined function. However, the "unit" does not always have a meaning limited to software or hardware. The "unit" may be constructed either to be stored in an addressable storage medium or to execute one or more processors. Therefore, the "unit" includes, for example, software elements, object-oriented software elements, class elements or task elements, processes, functions, properties, procedures, sub-routines, segments of a program code, drivers, firmware, micro-codes, circuits, data, databases, data structures, tables, arrays, and parameters. The elements and functions provided by the "unit" may either be combined into a smaller number of elements, or a "unit", or divided into a larger number of elements, or a "unit". Moreover, the elements and "units" or may be implemented to reproduce one or more CPUs within a device or a security multimedia card.

Wireless communication systems have evolved from early voice-oriented services to broadband wireless communication systems that provides high-speed, high-quality packet data services according to communication standards such as high-speed packet access (HSPA) of 3$^{rd}$ Generation Partnership Project (3GPP) standards, long-term evolution (LTE) or evolved universal terrestrial radio access (E-UTRA) standards, LTE-advanced (LTE-A) standards, LTE-Pro standards, high-rate packet data (HRPD) of 3GPP 2 (3GPP2) standards, ultra-mobile broadband (UMB) standards, and the Institute of Electrical and Electronics Engineers (IEEE) 802.16e standards.

As a representative example of a broadband wireless communication system, in an LTE system, an OFDM scheme is employed in a downlink, and a single-carrier frequency-division multiple access (SC-FDMA) scheme is employed in an uplink. An uplink is a radio link through which a terminal, a user equipment (UE), or a mobile station (MS) transmits data or control signals to a base station, and a downlink is a radio link through which a base station transmits data or control signals to a terminal. In such a multiple-access method, data or control information of each user is usually divided by performing assignment and operations so that time-frequency resources to which data or control information to be carried for each user do not overlap, that is, so that orthogonality is established.

As a future communication system after LTE, that is, since a 5G (or new radio (NR)) communication system should be able to freely reflect various requirements of users and service providers, services that simultaneously satisfy various requirements should be supported. Enhanced mobile broadband (eMBB), massive machine-type communication (mMTC), and ultra-reliable low-latency communication (URLLC) are services that are considered for 5G communication systems.

The eMBB service aims to provide a faster data rate than the data rate supported by existing LTE, LTE-A or LTE-Pro services. For example, in a 5G communication system, eMBB should be able to provide a maximum transmission rate of 20 gigabits per second (Gbps) in a downlink and 10 Gbps in an uplink from the viewpoint of one base station. In addition, the 5G communication system should provide the maximum transmission rate and at the same time should provide an increased user-perceived terminal data rate. In order to satisfy these requirements, improvements to various transmission/reception technologies are required, including a more advanced multiple-antenna (multiple-input multiple-output (MIMO)) transmission technology. In addition, while transmitting signals using the maximum 20 megahertz (MHz) transmission bandwidth in the 2 GHz band currently used by LTE, the 5G communication system uses a frequency bandwidth wider than 20 MHz in the frequency band of 3-6 GHz or 6 GHz or higher, thereby satisfying the required data transmission speed in a 5G communication system.

In addition, use of mMTC is being considered to support application services such as the IoT in 5G communication systems. In order to efficiently provide the IoT, mMTC is required to support large-scale terminal access within a cell, improve terminal coverage, prolong battery lifetimes, and reduce terminal costs. The IoT has various sensors and various devices attached thereto to provide communication functions and to support a large number of terminals (e.g., 1,000,000 terminals/square kilometer (km2)) within a cell. In addition, because the terminal supporting mMTC is highly likely to be located in a shadow area not covered by the cell, such as the basement of a building due to the characteristics of the service, a wider coverage than other services provided by the 5G communication system is required. Since the terminal supporting mMTC should be configured as a low-cost terminal, and since it is difficult to frequently exchange the battery of the terminal, a very long battery lifetime, such as 10 to 15 years, is required.

Lastly, URLLC is a cellular-based wireless communication service used for mission-critical purposes. For example, use thereof in services related to remote control for robots or machinery, industrial automation, unmanned aerial vehicles, remote health care, and emergency alerts may be considered. Therefore, the communication provided by URLLC should support very low latency and very high reliability. For example, a service supporting URLLC should satisfy an air interface latency of less than 0.5 milliseconds, and also have a packet error rate of $10^{-5}$ or less. Therefore, for a service supporting URLLC, a 5G system should provide a smaller transmission time interval (TTI) than other services, and in order to ensure reliability of the communication link, a wider resource should be allocated in a frequency band.

The three services of 5G, namely eMBB, URLLC, and mMTC, can be multiplexed and transmitted in one system. In this case, different transmission/reception techniques and transmission/reception parameters may be used between services in order to satisfy the different requirements of each service.

In 5G, when a base station transmits and receives data to a terminal in a 6 GHz band or higher, especially a mmWave band, coverage may be limited due to attenuation of the propagation path. The above problem of limited coverage can be solved by closely disposing a plurality of relay nodes between the base station and the propagation path of the terminal, but the cost of installing an optical cable for backhaul connection between the relays becomes expensive. Therefore, instead of installing an optical cable between the relays, the broadband radio frequency resources available in mmWave are used to transmit and receive backhaul data between the relays, thereby solving the problem of cost associated with installation of an optical cable and using the mmWave band more efficiently.

As described above, the technology for transmitting and receiving backhaul data from a base station using mmWave and finally transmitting and receiving access data to a terminal through a plurality of relays is called IAB. At this time, a relay node that transmits and receives data from a base station through a wireless backhaul is called an IAB node. In this case, the base station is composed of a CU and a DU, and the IAB node is composed of a DU and a MT. The CU manages DUs of all IAB nodes connected to the base station through multi-hop.

The IAB node uses the same frequency band when receiving backhaul data from the base station and transmitting access data to the terminal and when receiving access data from the terminal and transmitting backhaul data to the base station. Due to the characteristics of the IAB node, the IAB node has a half-duplex constraint at any given moment. Therefore, as a method for reducing the transmission/reception delay due to the unidirectional transmission/reception characteristic of the IAB node, upon reception by the IAB node, backhaul data (downlink data from the DU of the parent IAB node to the MT of the IAB node and uplink data from the MT of the child IAB node to the DU of the IAB node) and access data from the terminal (upstream data from the terminal to the IAB node) can be multiplexed and received in a frequency-division-multiplexing (FDM) and/or spatial-division-multiplexing (SDM) method.

Also, upon transmission by the IAB node, backhaul data (uplink data from the IAB node's MT to the parent IAB node's DU and downlink data from the IAB node's DU to the child IAB node's MT) and access data to the terminal (the downlink data from the IAB node to the terminal) can be multiplexed and transmitted using FDM and/or SDM. In this case, when the data transmission/reception directions of the DU and the MT do not match in the IAB node, it is necessary to define the operation of the IAB node according to the unidirectional transmission/reception characteristic. Accordingly, in the disclosure, the operation of the IAB node is provided.

FIG. 1 is a view illustrating a communication system in which an IAB is operated.

In FIG. 1, a gNB 101 is a typical base station (e.g., an eNB or a gNB), and is referred to as a base station or a donor base station in the disclosure. IAB node #1 111 and IAB node #2 121 are IAB nodes that transmit and receive backhaul links in an mmWave band. Terminal (i.e., UE) 1 102 transmits and receives access data through the gNB 101 and the access link 103. IAB node #1 111 transmits and receives backhaul data through the gNB 101 and the backhaul link 104. Terminal 2 112 transmits and receives access data through the IAB node #1 111 and the access link 113. IAB node #2 121 transmits and receives backhaul data through IAB node #1 111 and the backhaul link 114. Therefore, IAB node #1 111 is an upper IAB node of IAB node #2 121, and is also called a parent IAB (Parent IAB) node. IAB node #2 121 is a lower IAB node of IAB node #1 111, and is called a child IAB (Child IAB) node. Terminal 3 122 transmits and receives access data through the IAB node #2 121 and the access link 123.

Next, the measurement for the IAB node or the donor gNB of the terminal will be described.

When terminal 2 112 or terminal 3 122 performs measurement on a donor gNB or IAB node that is not a serving IAB node but a neighboring donor gNB or IAB node, coordination between the donor gNB and the IAB nodes may be required. That is, the donor gNB matches the measurement resource of the IAB node with an even number of hops, or the measurement resource of the IAB node with an odd number of hops, so that the terminal does not waste resources when measurement the neighboring IAB node or IAB base station. The terminal may receive, from a serving IAB node or a base station, a configuration to measure a synchronization signal block (SSB)/physical broadcast channel (PBCH) or a channel-state information reference signal (CSI-RS) for measuring a neighboring IAB node through a higher-layer signal. If the terminal receives the configuration to measure a neighboring base station through SSB/PBCH, in the terminal, at least two SSB/PBCH measurement timing configurations (SMTCs) per frequency may be configured for each measurement resource of an IAB node having an even number of hops or for each measurement resource of an IAB node having an odd number of hops. The terminal receiving the SMTC configurations may perform a measurement of an IAB node having an even number of hops in one SMTC, and may perform a measurement of an IAB node having an odd number of hops in another SMTC.

Next, the measurement for the IAB node or the other IAB nodes of the donor gNBs will be described.

In order for one IAB node to measure a donor gNB or IAB node in another neighbor, coordination between the donor gNB and IAB nodes may be required. That is, the donor gNB matches the measurement resources of the IAB nodes with an even number of hops or the measurement resources of the IAB nodes with an odd number of hops, so that waste of resources for one IAB node in measuring a neighboring IAB node or IAB base station can be minimized. The one IAB node may receive, from a serving IAB node or a base station, a configuration to measure SSB/PBCH or CSI-RS for measurement of neighboring IAB nodes through a higher-layer signal. If the IAB node receives the configuration to measure the measurement of neighboring base stations through SSB/PBCH, in the IAB node, at least two SMTCs per frequency may be configured for each measurement resource of an IAB node having an even number of hops or of an IAB node having an odd number of hops. The IAB node receiving the SMTC configurations may perform measurement of an IAB node with an even number of hops in one SMTC, and may perform measurement of an IAB node with an odd number of hops in another SMTC.

Next, in the IAB technology proposed in the disclosure, multiplexing of the backhaul link between the base station and the IAB node or between a first IAB node and a second IAB node, and multiplexing of the access link between the base station and the terminal or between the IAB node and the terminal within radio resources, will be described in more detail with reference to FIGS. 2, 3, and 4.

Figure 2:
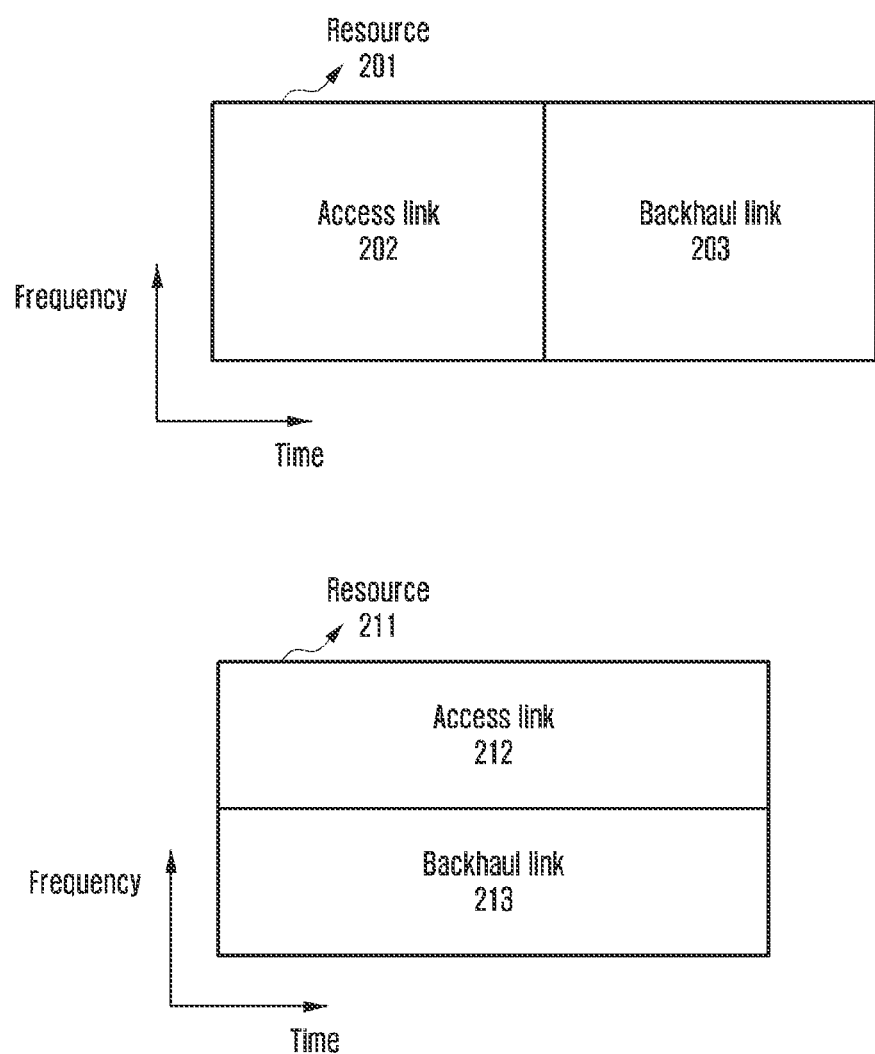
FIG. 2 is a view schematically illustrating multiplexing in a time domain and a frequency domain between an access link and a backhaul link in the IAB, according to an embodiment.

FIG. 2 is a view schematically illustrating multiplexing between an access link and a backhaul link in the IAB. In particular, the upper part of FIG. 2 illustrates that an IAB node is multiplexed in a time domain between an access link and a backhaul link. The lower part of FIG. 2 illustrates that an IAB node is multiplexed in a frequency domain between an access link and a backhaul link in an IAB node.

In the radio resource 201 shown at the upper part of FIG. 2, the backhaul link 203 between the base station and the IAB node or between a first IAB node and a second IAB node, and the access link 202 between the base station and the terminal or between the IAB node and the terminal, are time-division multiplexed (TDM). Therefore, in the time domain in which the base station or IAB node transmits and receives data to and from the terminal, data is not transmitted or received between the base station and the IAB nodes, and in the time domain in which data is transmitted and received between the base station and the IAB nodes, the base station or the IAB node does not transmit or receive data to or from the terminal.

Next, in the radio resource 211 shown in the lower part of FIG. 2, the backhaul link 213 between a base station and an IAB node or between a first IAB node and a second IAB node, and the access link 212 between the base station and the terminal or between the IAB node and the terminal are multiplexed (i.e., using FDM) in the frequency domain. Accordingly, it is possible to transmit and receive data between the base station and the IAB nodes in the time domain in which the base station or the IAB node transmits and receives data to the terminal, but only data transmission in the same direction is possible due to the unidirectional transmission and reception characteristics of the IAB nodes. That is, in the time domain in which one IAB node receives data from a terminal, the IAB node can only receive backhaul data from another IAB node or a base station. In addition, in the time domain in which one IAB node transmits data to a terminal, the IAB node can only transmit backhaul data to another IAB node or a base station.

In FIG. 2, only TDM and FDM have been described, but other types of multiplexing (i.e., SDM) in a spatial domain between an access link and a backhaul link is possible. Therefore, it is possible to transmit and receive the access link and the backhaul link at the same time through the SDM, but like the FDM at the bottom of FIG. 2, only data transmission in the same direction is possible in SDM due to the unidirectional transmission/reception characteristics of IAB nodes. That is, in the time domain in which one IAB node receives data from a terminal, the IAB node can only receive backhaul data from another IAB node or a base station. In addition, in the time domain in which one IAB node transmits data to a terminal, the IAB node can only transmit backhaul data to another IAB node or to a base station.

Regarding which multiplexing scheme to use among the above TDM, FDM, and SDM, when an IAB node initially accesses a base station or an upper IAB node, the IAB node may transmit the capability for the multiplexing scheme to the base station or an upper IAB node, and then receive the same from the corresponding base station or upper IAB nodes through system information or radio resource control (RRC) signals. Alternatively, it may be received from a base station or upper IAB nodes through a backhaul link after initial access. The multiplexing scheme may support at least one of TDM, FDM, and SDM.

Figure 3:
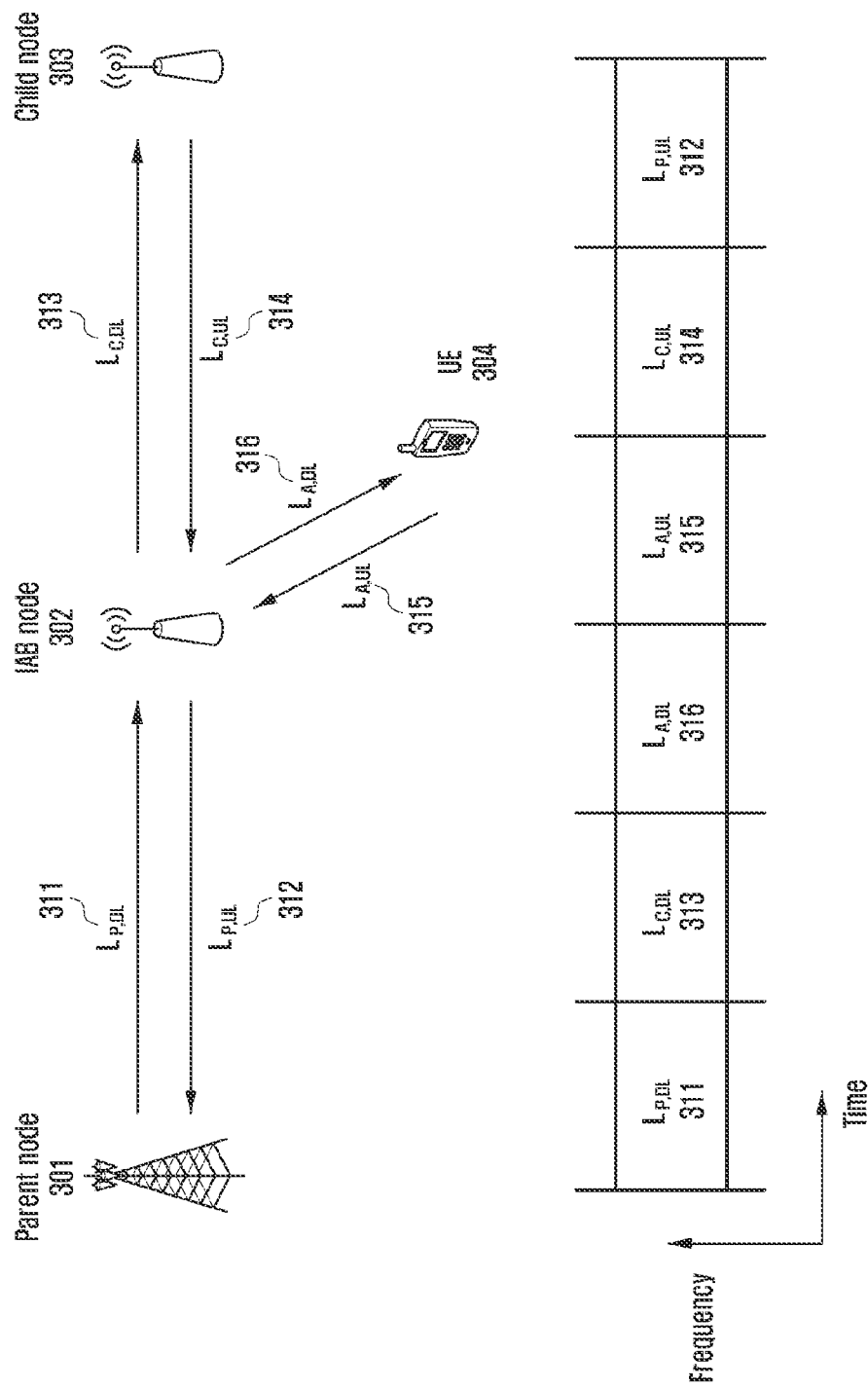
FIG. 3 is a view illustrating multiplexing in a time domain between an access link and a backhaul link in an IAB, according to an embodiment.

Next, FIG. 3 is a view illustrating multiplexing in a time domain between an access link and a backhaul link in IAB.

The upper part of FIG. 3 illustrates a process in which an IAB node 302 communicates with a parent IAB node 301, a child IAB node 303, and a terminal 304. In a more detailed description of the links between the nodes, the parent IAB node 301 transmits a backhaul downlink signal to the IAB node 302 in the backhaul downlink ($L_{P,\ DL}$), and the IAB node 302 transmits a backhaul uplink signal to the parent IAB node 301 in a backhaul uplink ($L_{P,\ UL}$). The IAB node 302 transmits an access downlink signal in the access downlink ($L_{A,\ DL}$) to the terminal 304, and the terminal 304 transmits an access uplink signal to the IAB node 302 in an access uplink ($L_{A,\ UL}$). The IAB node 302 transmits a backhaul downlink signal to the child IAB node 303 in a backhaul downlink ($L_{C,\ DL}$), and the IAB child node 303 transmits a backhaul uplink signal to the IAB node 302 in a backhaul uplink ($L_{C,\ UL}$). In the aforementioned notation, "P" denotes a backhaul link with a parent, "A" denotes an access link with a terminal, "C" denotes a backhaul link with a child, "DL" denotes a downlink, and "UL" denotes an uplink.

This link relationship is described based on the IAB node 302, and from the viewpoint of the IAB child node 303, the node in the parent-node relationship is the IAB node 302, and the IAB child node 303 may have another IAB child node in a lower layer. In addition, from the viewpoint of the parent IAB node 301, the node in the child-node relationship is the IAB node 302, and the parent IAB node 301 may have another IAB parent node in an upper layer.

As discussed above, the signal includes data and control information, a channel for transmitting data and control information, reference signals required to decode data and control information, or reference signals providing channel information.

The lower part of FIG. 3 illustrates a process in which all of the above links are multiplexed in the time domain. A backhaul downlink ($L_{P,\ DL}$) 311, a backhaul downlink ($L_{C,\ DL}$) 313, an access downlink ($L_{A,\ DL}$) 316, an access uplink ($L_{A,\ UL}$) 315, a backhaul uplink ($L_{C,\ UL}$) 314, and a backhaul uplink ($L_{P,\ UL}$) 312 are multiplexed in a temporal sequence. The relationship between the links provided in the drawing is an example, and any other relationship between the links may be applied.

Since the above links are sequentially multiplexed in the time domain, it can be seen that this is the multiplexing scheme that takes the most time to transmit a signal from the parent IAB node 301 to the child IAB node 303 via the IAB node 302, and also to the terminal. Therefore, as a method for reducing latency when finally transmitting a signal from the parent IAB node 301 to the terminal, a method of multiplexing two backhaul links or multiplexing the backhaul link and access links in a frequency domain, or of multiplexing in a spatial domain, followed by simultaneous transmission, can be considered.

Figure 4:
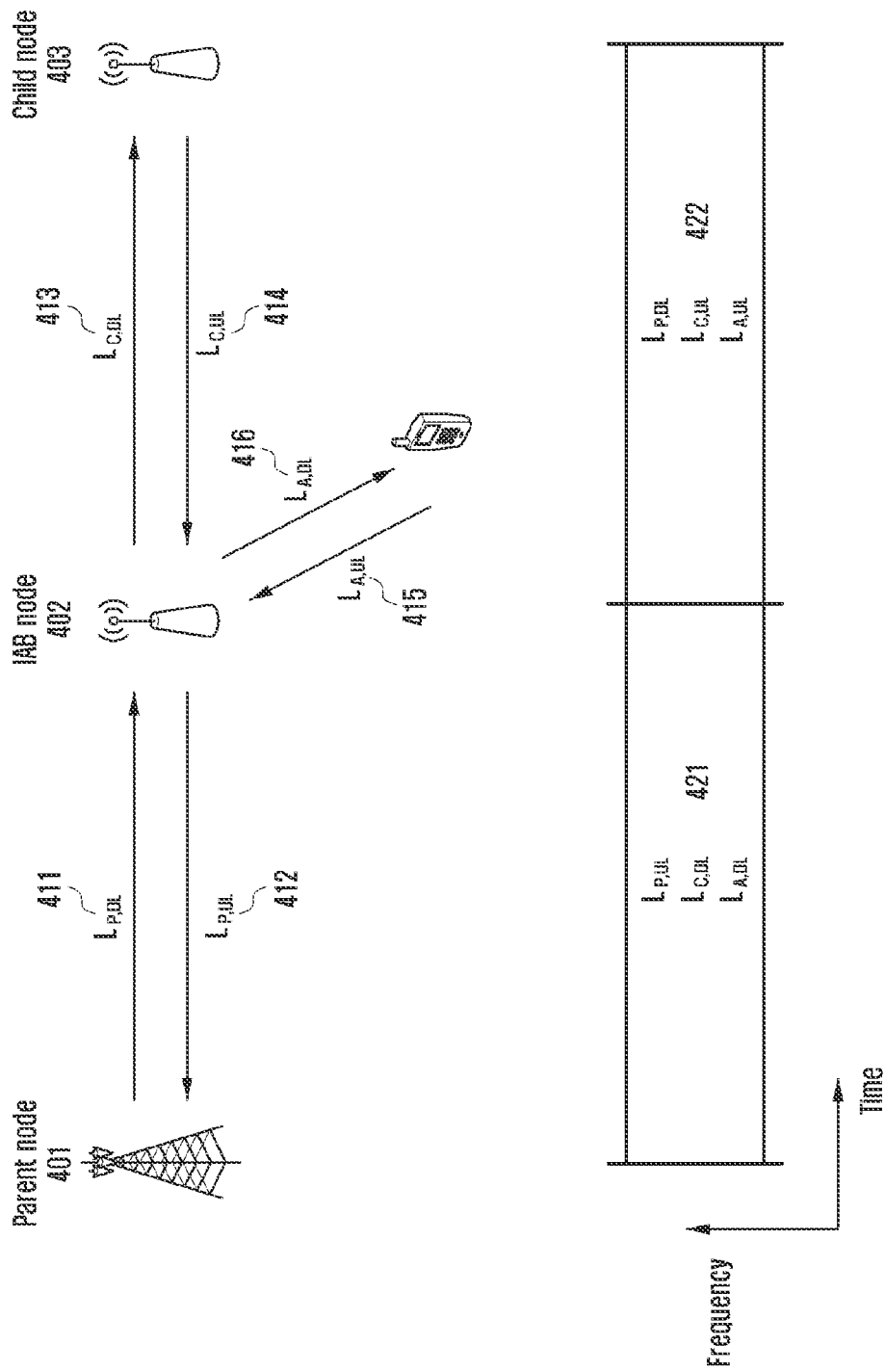
FIG. 4 is a view illustrating multiplexing in frequency and spatial domains between an access link and a backhaul link in an IAB, according to an embodiment.

FIG. 4 is a view illustrating multiplexing in frequency and spatial domains between an access link and a backhaul link in an IAB.

A method for reducing a time delay by multiplexing two backhaul links or multiplexing a backhaul link and an access link in a frequency domain or a spatial domain will be described with reference to FIG. 4.

Similar to FIG. 3, the process in which an IAB node 402 communicates with a parent IAB node 401, a child IAB node 403, and a terminal 404 is illustrated at the upper part of FIG. 4. In a more detailed description of the links between each node, the parent IAB node 401 transmits a backhaul downlink signal to the IAB node 402 in the backhaul downlink ($L_{P,\ DL}$), and the IAB node 402 transmits a backhaul uplink signal to the parent IAB node 401 in a backhaul uplink ($L_{P,\ UL}$). The IAB node 402 transmits an access downlink signal in the access downlink ($L_{A,\ DL}$) to the terminal 404, and the terminal 404 transmits an access uplink signal to the IAB node 402 in an access uplink ($L_{A, UL}$). The IAB node 402 transmits a backhaul downlink signal to the child IAB node 403 in the backhaul downlink ($L_{C, DL}$), and the IAB child node 403 transmits a backhaul uplink signal to the IAB node 402 in a backhaul uplink ($L_{C, UL}$). In the aforementioned notation, "P" denotes a backhaul link with a parent, "A" denotes an access link with a terminal, "C" denotes a backhaul link with a child, "DL" denotes a downlink, and "UL" denotes an uplink.

This link relationship is described based on the IAB node 402, and from the viewpoint of the IAB child node 403, the node in the parent-node relationship is the IAB node 402, and the IAB child node 403 may have another IAB child node in a lower layer. In addition, from the viewpoint of the parent IAB node 401, the node in the child-node relationship is the IAB node 402, and the parent IAB node 401 may have another IAB parent node in an upper layer.

As described above, the signal includes data and control information, a channel for transmitting data and control information, a reference signal required to decode data and control information, or a reference signal for providing channel information.

The lower part of FIG. 4 illustrates a scheme for multiplexing the above-described links in the frequency domain or the spatial domain.

As described above, since the IAB node has a unidirectional transmission/reception characteristic at any given moment, the signals that can be multiplexed in the frequency domain or spatial domain are limited. For example, when considering the unidirectional transmission/reception characteristic of the IAB node 402, the links that can be multiplexed in the time domain in which the IAB node can perform transmission are backhaul uplinks ($L_{P, UL}$) 412, backhaul downlinks ($L_{C, DL}$) 413, or access downlinks ($L_{A, DL}$) 416. Accordingly, when the links are multiplexed in the frequency domain or in the spatial domain, the IAB node 402 may transmit all of the links in the same time domain, as in 421. In addition, the links that can be multiplexed in the time domain that the IAB node can receive are backhaul downlinks ($L_{P, DL}$) 411, backhaul uplinks ($L_{C, UL}$) 414, access uplinks ($L_{A, UL}$) 415, etc. Accordingly, when the links are multiplexed in the frequency domain or in the spatial domain, the IAB node 402 can receive all of the links in the same time domain, as shown in 422.

The multiplexing of the links provided in the drawing is an example, and it goes without saying that only two links may be multiplexed out of three links multiplexed in a frequency or spatial domain.

Next, the structure of the IAB node will be described.

In 5G, in order to support various services such as large-capacity transmission, low-latency, high-reliability, or large-volume IoT devices, and to reduce communication network installation costs (capital expenditure (CAPEX)), various types of base station structures that are optimal for service requirements were studied. In 4G LTE, in order to reduce CAPEX and effectively handle interference control, a cloud RAN (C-RAN) structure in which the data-processing unit of the base station and the radio transmission/reception unit (or remote radio head (RRH)) are separated, the data-processing unit is processed at the center, and only the wireless transmission/reception unit being placed at the cell site has been commercialized. In the C-RAN structure, when transmitting baseband digital IQ data from a base station data-processing unit to a wireless transmission/reception unit, an optical link conforming to the Common Public Radio Interface (CPRI) standard is generally used.

When data is transmitted to such a wireless transmission/reception unit, a high data transmission rate is required. For example, a 614.4 Mbps data transmission rate is required when sending 10 MHz Internet protocol (IP) data, and a 1.2 Gbps data transmission rate is required when sending 20 MHz IP data.

Therefore, in the 5G RAN structure, the base station is divided into a CU and a DU in order to reduce the enormous load of the optical link, and a functional split is applied to the CU and DU to realize various structures. In 3GPP, standardization of various functional split options between CU and DU is being advanced, and options for a functional split are divided by function between protocol layers or within a protocol layer, and there are a total of 8 options from option 1 to option 8. Among them, options 2 and 7 are first considered structures in the current 5G base station structure. In option 2, RRC and packet data convergence protocol (PDCP) are located in the CU, and radio link control (RLC), medium access control (MAC), a physical layer and a radio frequency (RF) are located in the DU. In option 7, RRC, PDCP, RLC, MAC, and the upper physical layer is located in the CU, and the lower physical layer is located in the DU. It is possible to have a structure having configuration flexibility in which NR network protocols are separated and moved between CU and DU through the functional split as described above. Through this structure, flexible hardware implementation provides a cost-effective solution, and the separation structure between CU and DU enables adjustment of load management, real-time performance optimization, and network functions virtualization (NFV)/software-defined networking (SDN), and such a configurable functional split has an advantage of applicability to various applications (variable latency in transmission).

Figure 5:
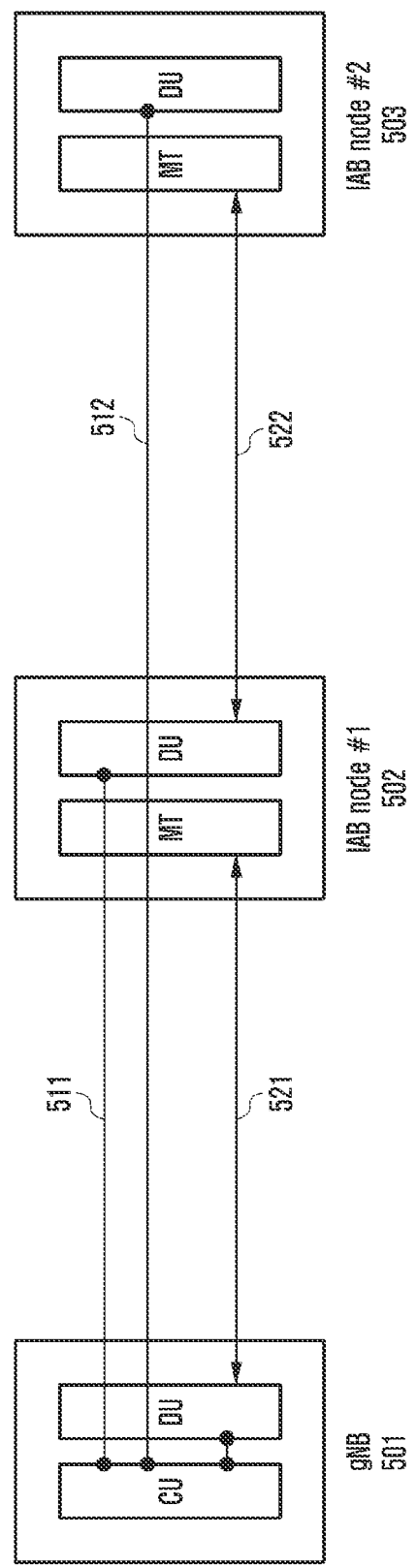
FIG. 5 is a view illustrating the structure of an IAB node, according to an embodiment.

The structure of the IAB node taking the function of splitting into consideration will be described with reference to FIG. 5. FIG. 5 is a view schematically illustrating the structure of an IAB node.

In FIG. 5, a gNB 501 is composed of a CU and DU, and IAB nodes consist of a termination function (or MT) for transmitting and receiving data on a parent node and a backhaul link, and a base station function (or DU) for transmitting and receiving data on a child node and a backhaul link. In FIG. 5, IAB node #1 502 is wirelessly connected to the gNB 501 through one hop, and IAB node #2 503 is wirelessly connected to the gNB 501 through two hops through the IAB node #1 502.

As shown in FIG. 5, the CU of the gNB 501 controls (via 511 and 512) not only the DU of the gNB 501 but also all IAB nodes wirelessly connected to the gNB 501, i.e., the DU of IAB node #1 502 and IAB node #2 503. The CU may allocate radio resources to the DU so that the DU can transmit and receive data with the MT of the IAB node in a lower layer. The allocation of the radio resource may be transmitted to the DU through system information, a higher-layer signal, or a physical signal using an F1 application protocol (FLAP) interface. In this case, the radio resource may be composed of a downlink time resource, an uplink time resource, and a flexible time resource.

Hereinafter, the radio resource configuration will be described in detail based on IAB node #2 503. The downlink time resource is a resource for transmitting downlink control/data and signals to the MT of the IAB node by the DU of the IAB node #2 503. The uplink time resource is a resource for receiving uplink control/data and signals from the MT of the IAB node in which the DU is lower. The flexible time resource is a resource that can be used as a downlink time resource or an uplink time resource by the DU, and how the flexible time resource will be used may be indicated to the MT of the lower IAB node through the downlink control signal of the DU. Upon receiving the downlink control signal, the MT determines whether the flexible time resource is to be used as a downlink time resource or an uplink time resource. When the downlink control signal is not received, the MT does not perform a transmission/reception operation. That is, the MT does not monitor, decode, or measure a signal from the resource in the downlink control channel. In the above resource, the MT does not perform a transmission/reception operation. That is, the MT does not monitor, decode, or measure a signal from the resource in the downlink control channel. For the downlink time resource, uplink time resource, and flexible time resource, two different types (or three different types including the time resource that is not always available) of resources may be indicated from the CU to the DU.

The first type of resource is a soft type, and the CU can set a soft-type downlink time resource, an uplink time resource, and a flexible time resource to the DU of IAB node #2 503 using F1AP (i.e., the interface between the CU and the DU). In this case, for the configured soft type resources, the IAB node #1, which is the parent IAB (or DU of the parent IAB) of IAB node #2 503, may explicitly (e.g., by a DCI format) or implicitly indicate whether the above resources are available or not available to IAB node #2, which is the child IAB (or DU of the child IAB). That is, when it is indicated that a specific resource is available, the DU of the IAB node #2 503 may utilize the resource for data transmission/reception with the MT of the lower IAB node. That is, the DU of IAB node #2 503 may, using the resource, perform transmission in the case of a downlink resource or may perform reception in the case of an uplink resource. If it is indicated that the resource is not available, the IAB node #2 503 cannot use the resource for data transmission/reception with the MT of the lower IAB node. That is, the DU of IAB node #2 503 cannot be transmitted or received using the resource.

A method of indicating the availability of the soft-type resource based on the DCI format will be described in more detail. The DCI format in this embodiment may include an availability indicator for indicating the availability of one or more consecutive uplink, downlink, or flexible symbols.

In order to receive the DCI format, the IAB node #2 503 may receive location information of an availability indicator indicating the availability of the IAB node #2, a table indicating the availability of time resources corresponding to a plurality of slots, and information on at least one or more of mapping relations of the availability indicator from the DCI format by a higher-layer signal from the CU or parent IAB along with the cell ID of the DU of IAB node #2 503 in advance. A value (or indicator) indicating the availability of a continuous uplink symbol, a downlink symbol, or a flexible symbol within one slot, and the meaning of the value (or indicator), may be configured as shown in Table 1 below, in which "DL" refers to downlink and "UL" refers to uplink.

TABLE 1

| Value | Indication |
|---|---|
| 0 | No resource availability |
| 1 | DL resource available |
| 2 | UL resources available |
| 3 | DL and UL resources available |
| 4 | Flexible resources available |
| 5 | DL and Flexible resources available |

TABLE 1-continued

| Value | Indication |
|---|---|
| 6 | UL and Flexible resources available |
| 7 | DL, UL, and Flexible resources available |

When the above availability indicator is indicated from the parent IAB to IAB node #2 503 according to the DCI format and the IAB node #2 receives the indication, the following method may be considered as a method for interpreting the relationship between the downlink, uplink, or flexible time resource configured from the CU to the IAB DU by the DU of the IAB node #2 503 and the aforementioned availability.

A first method is a method in which the number of values indicating the availability in the availability indicator included in the DCI format in the IAB DU is expected to match the number of slots including the soft type resource composed of consecutive symbols configured by the CU. According to this method, it can be determined that the IAB DU is applied only to a slot including a soft type resource.

A second method is a method in which the number of values indicating the availability of the availability indicator included in the DCI format of the IAB DU is expected to match the number of all of the slots configured by the CU, that is, the number of all of the slots including the hard/soft/non-available (NA) type. Meanwhile, the IAB DU may determine that the availability is applied only to the slot including the soft type, and may determine that the indicated utilization is not applied to the slot including only the hard or NA type, without the soft type.

In the first and second methods, the IAB DU may expect the value indicating the availability and the downlink resource, uplink resource, or flexible resource configured by the CU match. For example, when only a downlink soft resource or a downlink hard resource exists in a slot, it can be expected that only the value of 1, in Table 1 above, can be indicated for the IAB DU. Therefore, it can be expected that values including the availability of uplink soft resources among the values in the above table are not indicated.

Alternatively, the IAB DU may determine that it is possible to indicate whether a downlink resource or an uplink resource is available in addition to a value indicating that the flexible resource is available in the flexible resource set by the CU. For example, in the case of a flexible soft resource or a flexible hard resource, it can be expected that the DU of the IAB node can indicate a value of 1 or 2 instead of the value of 4 in Table 1 above. In this case, it may be determined that the DU of the IAB node #2 can be used only with the uplink resource or the downlink resource according to the instruction of the parent IAB, instead of using the flexible resource as an uplink resource or a downlink resource at the judgment of IAB node #2.

Alternatively, the IAB DU expects that a value of 0 can be indicated in Table 1 in any hard/soft or NA resource set by the CU. In this case, the IAB DU determines that resource utilization is not possible in the hard/soft resources previously set by the CU, and the IAB DU assumes that the DU of the IAB node #2 is not available for data transmission or reception with the MT of the lower IAB node until it is indicated that it is available by the DCI format, as in the case of an always unavailable resource type configured by CU. Thereafter, when availability is indicated again by the DCI format, the DU of the IAB node #2 may set the resource by the CU and utilize it as received by the DCI format.

The second type of resource is a hard type resource, and the above resources are always utilized between DU and MT. That is, the DU of IAB node #2 may perform transmission when the resource is a downlink time resource regardless of the transmission/reception operation of the MT of IAB node #2, and may perform reception when the resource is an uplink resource. When the resource is a flexible resource, transmission or reception is performed according to the determination of the IAB DU (that is, the determination may be matching the DCI format, indicating whether the flexible resource is a downlink resource or an uplink resource, to the MT of the lower IAB node).

The third type of resource is a type of resource that is always not available (always unused or always unavailable), and the above resources are not available to the DU of IAB node #2 for data transmission and reception with the MT.

The above types of resources are received together when a downlink time resource, an uplink time resource, a flexible time resource, and a reserved time resource are received as a higher-layer signal from the CU to the DU.

Next, the DU of the gNB 501 is a typical base station, and the DU controls the MT of the IAB node #1 502 to perform scheduling so as to transmit and receive data 521. The DU of the IAB node #1 502 is a conventional base station, and the DU controls the MT of the IAB node #2 503 to perform scheduling so that data can be transmitted and received 522.

The DU may indicate a radio resources so that data can be transmitted and received with the MT of the lower IAB node, based on the radio resource allocated from the CU. The configuration of the radio resource may be transmitted to the MT through system information, a higher-layer signal, or a physical signal. In this case, the radio resource may be composed of a downlink time resource, an uplink time resource, a flexible time resource, and a reserved time resource. The downlink time resource is a resource for transmitting downlink control/data and signals to an MT of an IAB node in which the DU is lower. The uplink time resource is a resource for receiving uplink control/data and signals from the MT of the IAB node in which the DU is lower.

The flexible time resource is a resource that can be used as a downlink time resource or an uplink time resource by the DU, and how the flexible time resource will be used may be indicated to the MT of the lower IAB node by the downlink control signal of the DU. Upon receiving the downlink control signal, the MT determines whether the flexible time resource is to be used as a downlink time resource or an uplink time resource. When the downlink control signal is not received, the MT does not perform a transmission/reception operation. That is, the MT does not monitor, decode, or measure a signal from the resource in the downlink control channel.

The downlink control signal is signaled to the MT by a combination of a higher-layer signal and a physical signal, and the MT may determine a slot format in a specific slot by receiving the signaling. The slot format commonly starts with a downlink symbol, has a flexible symbol located in the middle, and ends with an uplink symbol at the end (that is, a structure having an order of downlink-flexible-uplink (DFU)). When using only the above slot format, the DU of the IAB node can perform downlink transmission at the beginning of the slot, but the MT of the IAB node is configured only with the above slot format (i.e., DFU structure) from the parent IAB. Accordingly, uplink transmission cannot be performed at the same time (corresponding to slot format indexes 0 to 55 in Table 2, below). Therefore, a slot format configured to start with an uplink symbol, to place a flexible symbol in the middle, and to end with a downlink symbol can be defined as shown in Table 2, below (corresponding to slot format indexes 56 to 82 in Table 2, below). The slot format defined in Table 2 is transmitted to the MT using the downlink control signal, and may be configured from the CU using the F1AP to the DU. In Table 2, "D" is a downlink symbol, "U" is an uplink symbol, and "F" is a flexible symbol.

TABLE 2

| Format | Symbol number in a slot | | | | | | | | | | | | | |
|---|---|---|---|---|---|---|---|---|---|---|---|---|---|---|
| | 0 | 1 | 2 | 3 | 4 | 5 | 6 | 7 | 8 | 9 | 10 | 11 | 12 | 13 |
| 0 | D | D | D | D | D | D | D | D | D | D | D | D | D | D |
| 1 | U | U | U | U | U | U | U | U | U | U | U | U | U | U |
| 2 | F | F | F | F | F | F | F | F | F | F | F | F | F | F |
| 3 | D | D | D | D | D | D | D | D | D | D | D | D | D | F |
| 4 | D | D | D | D | D | D | D | D | D | D | D | D | F | F |
| 5 | D | D | D | D | D | D | D | D | D | D | D | F | F | F |
| 6 | D | D | D | D | D | D | D | D | D | D | F | F | F | F |
| 7 | D | D | D | D | D | D | D | D | D | F | F | F | F | F |
| 8 | F | F | F | F | F | F | F | F | F | F | F | F | F | U |
| 9 | F | F | F | F | F | F | F | F | F | F | F | F | U | U |
| 10 | F | U | U | U | U | U | U | U | U | U | U | U | U | U |
| 11 | F | F | U | U | U | U | U | U | U | U | U | U | U | U |
| 12 | F | F | F | U | U | U | U | U | U | U | U | U | U | U |
| 13 | F | F | F | F | U | U | U | U | U | U | U | U | U | U |
| 14 | F | F | F | F | F | U | U | U | U | U | U | U | U | U |
| 15 | F | F | F | F | F | F | U | U | U | U | U | U | U | U |
| 16 | D | F | F | F | F | F | F | F | F | F | F | F | F | F |
| 17 | D | D | F | F | F | F | F | F | F | F | F | F | F | F |
| 18 | D | D | D | F | F | F | F | F | F | F | F | F | F | F |
| 19 | D | F | F | F | F | F | F | F | F | F | F | F | F | U |
| 20 | D | D | F | F | F | F | F | F | F | F | F | F | F | U |
| 21 | D | D | D | F | F | F | F | F | F | F | F | F | F | U |
| 22 | D | F | F | F | F | F | F | F | F | F | F | F | U | U |
| 23 | D | D | F | F | F | F | F | F | F | F | F | F | U | U |
| 24 | D | D | D | F | F | F | F | F | F | F | F | F | U | U |
| 25 | D | F | F | F | F | F | F | F | F | F | F | U | U | U |
| 26 | D | D | F | F | F | F | F | F | F | F | F | U | U | U |
| 27 | D | D | D | F | F | F | F | F | F | F | F | U | U | U |
| 28 | D | D | D | D | D | D | D | D | D | D | D | D | D | F |
| 29 | D | D | D | D | D | D | D | D | D | D | D | D | F | U |
| 30 | D | D | D | D | D | D | D | D | D | F | F | F | U | U |
| 31 | D | D | D | D | D | D | D | D | D | D | F | U | U | U |
| 32 | D | D | D | D | D | D | D | D | D | F | U | U | U | U |
| 33 | D | D | D | D | D | D | D | D | F | F | F | U | U | U |
| 34 | D | F | U | U | U | U | U | U | U | U | U | U | U | U |
| 35 | D | D | F | U | U | U | U | U | U | U | U | U | U | U |
| 36 | D | D | D | F | U | U | U | U | U | U | U | U | U | U |
| 37 | D | F | F | U | U | U | U | U | U | U | U | U | U | U |
| 38 | D | D | F | F | U | U | U | U | U | U | U | U | U | U |
| 39 | D | D | D | F | F | U | U | U | U | U | U | U | U | U |
| 40 | D | F | F | F | U | U | U | U | U | U | U | U | U | U |
| 41 | D | D | F | F | F | U | U | U | U | U | U | U | U | U |
| 42 | D | D | D | F | F | F | U | U | U | U | U | U | U | U |
| 43 | D | D | D | D | D | D | D | D | F | F | F | F | F | U |
| 44 | D | D | D | D | D | D | F | F | F | F | F | F | U | U |
| 45 | D | D | D | D | D | F | F | U | U | U | U | U | U | U |
| 46 | D | D | D | D | F | U | D | D | D | D | D | F | U | U |
| 47 | D | D | F | U | U | U | D | D | F | U | U | U | U | U |
| 48 | D | F | U | U | U | U | D | F | U | U | U | U | U | U |
| 49 | D | D | D | D | F | F | U | D | D | D | F | F | U | U |
| 50 | D | D | F | F | U | U | D | D | F | F | U | U | U | U |
| 51 | D | F | F | U | U | U | D | F | F | U | U | U | U | U |
| 52 | D | F | F | F | F | F | U | D | F | F | F | F | F | U |
| 53 | D | D | F | F | F | F | U | D | D | F | F | F | F | U |
| 54 | F | F | F | F | F | F | D | D | D | D | D | D | D | D |
| 55 | D | D | F | F | F | U | U | D | D | D | D | D | D | D |
| 56 | U | F | F | F | F | F | F | F | F | F | F | F | F | D |
| 57 | U | U | F | F | F | F | F | F | F | F | F | F | F | D |
| 58 | U | U | U | F | F | F | F | F | F | F | F | F | F | D |
| 59 | U | F | F | F | F | F | F | F | F | F | F | F | D | D |
| 60 | U | U | F | F | F | F | F | F | F | F | F | F | D | D |
| 61 | U | U | U | F | F | F | F | F | F | F | F | F | D | D |
| 62 | U | F | F | F | F | F | F | F | F | F | F | D | D | D |
| 63 | U | U | F | F | F | F | F | F | F | F | F | D | D | D |
| 64 | U | U | U | F | F | F | F | F | F | F | F | D | D | D |
| 65 | U | U | U | U | U | U | U | U | U | U | U | U | F | D |
| 66 | U | U | U | U | U | U | U | U | U | U | U | F | F | D |

TABLE 2-continued

| For-mat | Symbol number in a slot | | | | | | | | | | | | | |
|---|---|---|---|---|---|---|---|---|---|---|---|---|---|---|
| | 0 | 1 | 2 | 3 | 4 | 5 | 6 | 7 | 8 | 9 | 10 | 11 | 12 | 13 |
| 67 | U | U | U | U | U | U | U | U | U | U | F | F | F | D |
| 68 | U | U | U | U | U | U | U | U | U | U | U | F | D | D |
| 69 | U | U | U | U | U | U | U | U | U | U | F | F | D | D |
| 70 | U | U | U | U | U | U | U | U | U | F | F | F | D | D |
| 71 | U | F | D | D | D | D | D | D | D | D | D | D | D | D |
| 72 | U | U | F | D | D | D | D | D | D | D | D | D | D | D |
| 73 | U | U | U | F | D | D | D | D | D | D | D | D | D | D |
| 74 | U | F | F | D | D | D | D | D | D | D | D | D | D | D |
| 75 | U | U | F | F | D | D | D | D | D | D | D | D | D | D |
| 76 | U | U | U | F | F | D | D | D | D | D | D | D | D | D |
| 77 | U | F | F | F | D | D | D | D | D | D | D | D | D | D |
| 78 | U | U | F | F | F | D | D | D | D | D | D | D | D | D |
| 79 | U | U | U | F | F | F | D | D | D | D | D | D | D | D |
| 80 | U | U | U | U | U | U | U | U | U | F | F | F | F | D |
| 81 | U | U | U | U | U | U | F | F | F | F | F | F | D | D |
| 82 | U | U | U | U | U | U | F | F | D | D | D | D | D | D |

The reserved time resource is a resource in which data cannot be transmitted/received with an MT below the DU, and the MT does not perform a transmission/reception operation in the resource. That is, the MT does not monitor, decode, or measure a signal from the resource in the downlink control channel.

Accordingly, the MT in one IAB node is controlled by DUs in the upper IAB nodes to receive scheduling information to transmit and receive data, and the DUs in the same IAB nodes are controlled by the CU of the gNB 501, so that the MT and DU in one IAB are controlled by different subjects, thereby making it difficult to perform coordination in real time.

Figure 6:
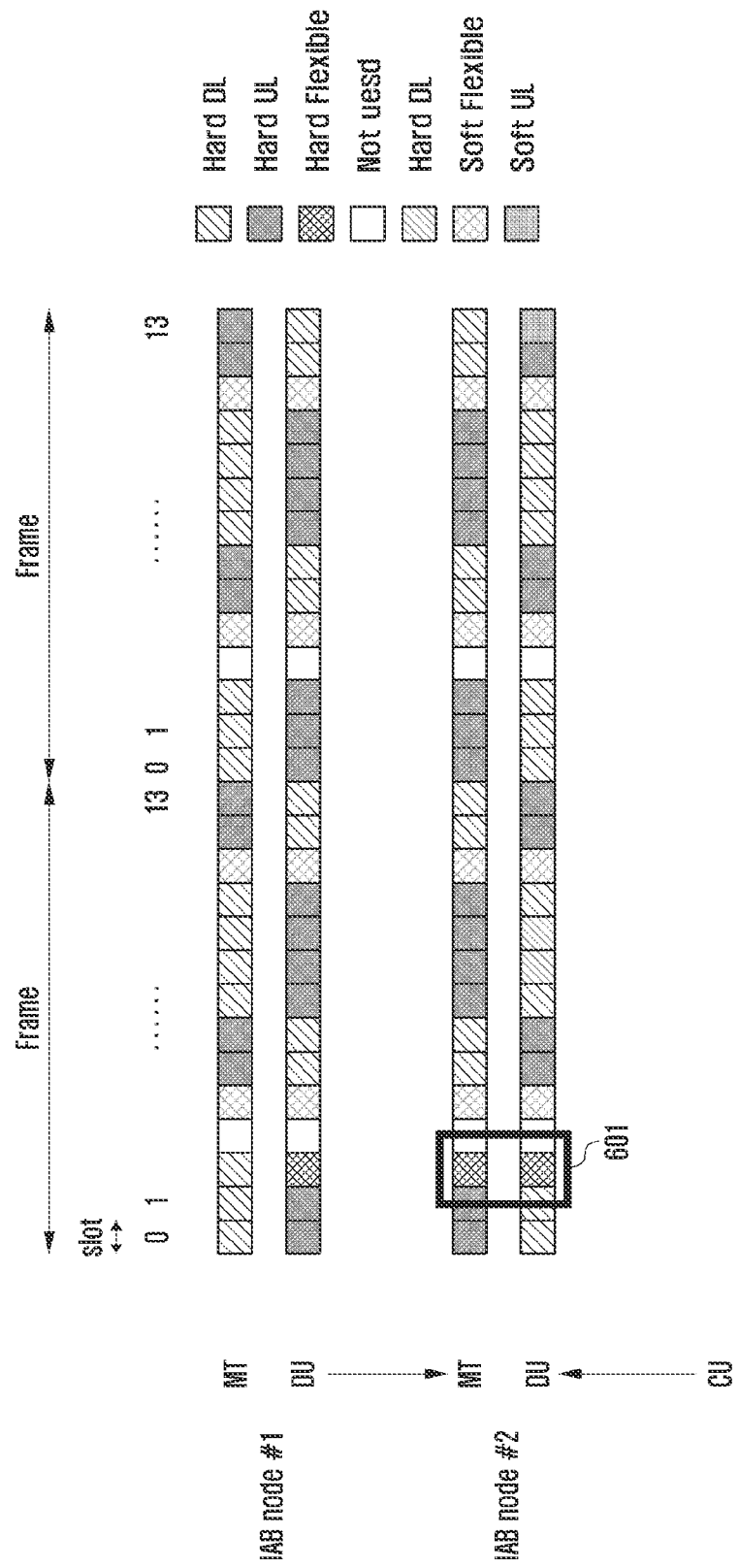
FIG. 6 is a view illustrating a problem that occurs when dynamic resource allocation for IAB is applied, according to an embodiment.

FIG. 6 is a view illustrating a problem that occurs when dynamic resource allocation for IAB is applied.

FIG. 6 illustrates the state in which the DU of IAB node #1 indicates the above-described resources to the MT of IAB node #2 according to FIG. 5, and in which the CU of the gNB provides instruction on resource allocation to the DU of IAB node #2, as shown in FIG. 5. In this case, as shown in 601 of FIG. 6, both DU and MT of IAB node #2 receive the same time resources as a flexible time resource. In this case, the MT of IAB node #2 determines the flexible time resource as a downlink time resource or an uplink time resource according to the instruction of the DU of IAB node #1. Subsequently, the MT of IAB node #2 may receive the downlink control/data channel and reference signal when determining the flexible time resource as the downlink time resource according to scheduling, or may transmit an uplink control/data channel and a reference signal when determining the flexible time resource as an uplink time resource. On the other hand, the DU of the IAB node #2 may instruct the MT of the lower IAB node to determine the flexible time resource as the uplink time resource and transmit the uplink control/data channel and the reference signal, or may perform instruction for reception of a downlink control/data channel and a reference signal by determining a downlink time resource.

Therefore, according to the indication of the DU of the IAB node #1 and the determination of the DU of the IAB node #2, each of the MT and the DU of the IAB node #2 should determine and perform transmission/reception in the flexible time resource. There may be the case where the unidirectional transmission/reception characteristic of the IAB node cannot be satisfied. For example, the MT of IAB node #2 may determine the flexible time resource as a downlink time resource according to the instruction of the DU of IAB node #1 to receive a downlink control/data channel and a reference signal, and at the same time, the DU of IAB node #2 may transmit a downlink control/data channel and a reference signal by determining the flexible time resource as a downlink time resource. Therefore, when the MT of IAB node #2 needs to receive and transmit the DU, the unidirectional transmission/reception characteristic cannot be satisfied.

Accordingly, in the disclosure, a scheme for transmitting and receiving data on a backhaul link while satisfying the unidirectional transmission/reception characteristic of an IAB node when transmission/reception of an MT and a DU in an IAB node collide is provided.

According to an embodiment, in FIG. 6, when the DU of IAB node #1 has been assigned a specific time resource as a soft type from the CU, and the time resource is not utilized by the DU of the parent IAB node, that is, IAB node #1, the MT of IAB node #2 of FIG. 6 determines that the time resource is not used for transmission/reception, so the IAB node #2 may transmit and receive data by only considering the DU. That is, for the unidirectional transmission/reception characteristic, IAB node #2 can transmit/receive DU of IAB node #2 without considering the transmission/reception of MT of IAB node #2. Accordingly, IAB node #2 may prioritize transmission and reception of DU over transmission and reception of MT.

Alternatively, when the DU of IAB node #2 is assigned a specific time resource as a soft type from the CU, the MT of the child IAB node explicitly or implicitly indicates that the time resource is not used, the IAB node #2 may transmit and receive data considering only the MT. That is, for unidirectional transmission/reception characteristics, the IAB node #2 may transmit/receive the MT according to the scheduling of the DU of the IAB node #1, without considering the transmission/reception of the DU of the IAB node #2.

In addition, an embodiment may be applied when one or more of the following conditions are satisfied:

Condition 1 is a condition in which the DU of IAB node #1 is assigned a specific time resource as a soft type from the CU in FIG. 6, and the time resource is explicitly or implicitly instructed to the MT of IAB mode #2 of FIG. 6 so that the time resource is used by the DU of IAB node #1, which is the parent IAB node, so that the MT of the IAB node #2 determines that the time resource is used for transmission and reception, or the DU of the IAB node #1 is allocated the specific time resource as a hard type from the CU; and/or Condition 2 is a condition in which the DU of IAB node #2 is assigned a specific time resource as a soft type from the CU, and may explicitly or implicitly instruct the MT of the child IAB node to use the time resource, and alternatively, the DU of the IAB node #2 is allocated the specific time resource as a hard type from the CU.

If IAB node #2 determines that both Condition 1 and Condition 2, above, are satisfied, the IAB node #2 may simultaneously receive the DU and MT of IAB node #2 in the time resource only when the MT of IAB node #2 is reception and the DU of IAB node #2 is reception, or the DU and MT of IAB node #2 may be simultaneously transmitted in the time resource only when the MT of IAB node #2 is transmission and the DU of IAB node #2 is transmission.

If IAB node #2 determines that Condition 1 and Condition 2, above, are satisfied at the same time, IAB node #2 performs transmission/reception of only one of the DU or MT according to the unidirectional transmission and reception characteristics of the IAB node when the MT of IAB node #2 is transmission, the DU of IAB node #2 is reception, or the MT of IAB node #2 is reception and DU of IAB node #2 is transmission.

Additionally, an embodiment may be applied to achieve a method of performing transmission/reception of only one of the DU or MT.

The IAB node may determine whether to prioritize transmission and reception of DU or MT based on a priority rule. Accordingly, which link transmission power or transmission should be prioritized may be determined based on the transmission channel or transmission information of the DU or MT, when transmission and reception of DUs or MTs in one IAB node are to be performed simultaneously, as described in FIG. 6. For example, the priority rule of a transport channel or transmission information may be determined as follows.

First priority may include a synchronization signal, a tracking reference signal (TRS) for estimating the phase of a channel, or a synchronization signal or CSI-RS transmitted for discovery of IAB nodes.

Second priority may include uplink control information including hybrid automatic repeat request acknowledgment (HARQ-ACK).

Third priority may include an uplink data channel including HARQ-ACK.

Fourth priority may include downlink control information, downlink data information, and/or CSI-RS.

Accordingly, the first priority may be the channel or information that should be prioritized, and the importance decreases compared to the next priority. The above priority rule is an example, and which information or channel should be prioritized may be determined differently, and the transmission priority as described above may be determined according to a standard. In the above, when the transmission power is limited, transmission power is given first, or transmission is always performed. Conversely, not being prioritized means that when the transmission power is limited, transmission power is reduced compared to the priority level, or that transmission is dropped.

The transmission channel or transmission information is a channel or information that can be transmitted in the backhaul uplink ($L_{P,\ UL}$) 412, backhaul downlink ($L_{C,\ DL}$) 413, and access downlink ($L_{A,\ DL}$) 416, and when the same channel or information is transmitted on two different links, a backhaul link may have priority, or an access link may have priority. In addition, the transmission waveform of the links may be configured as cyclic prefix (CP)-OFDM or discrete Fourier transform spread (DFT-S)-OFDM by higher-layer signaling or X2 signaling. In the above case, when two different links are transmitted with different waveforms, DFT-S-OFDM may have priority over CP-OFDM.

The channel or link containing information of the priority is given priority to the MT or DU of the IAB node in terms of transmission power or transmission, and is transmitted and received, and other DUs or MTs that are not transmitted/received drop transmission/reception. As another priority rule, transmission/reception with a parent IAB node may always be prioritized. That is, the MT of one IAB node may be prioritized. In this case, the DU of the IAB node should drop transmission/reception with the MT of the child IAB node, or should be avoided by scheduling.

Alternatively, transmission and reception with child IAB nodes may always be prioritized as another priority rule. That is, the DU of one IAB node may be prioritized. In this case, the MT of the IAB node should drop the scheduling by the DU of the parent IAB node or transmission/reception by instruction.

Figure 7:
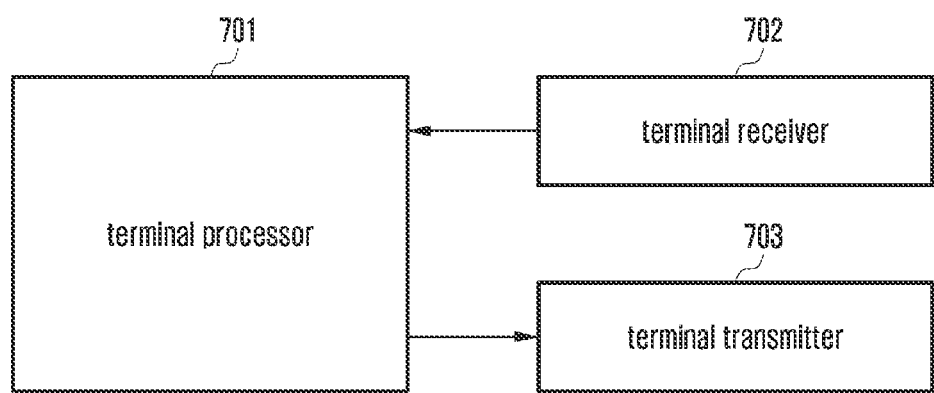
FIG. 7 is a view illustrating a terminal device, according to an embodiment.
Figure 8:
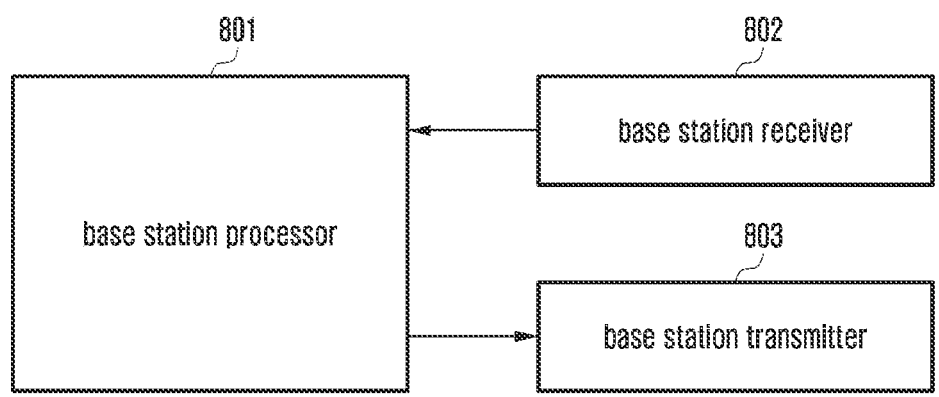
FIG. 8 is a view illustrating a base station apparatus, according to an embodiment.
Figure 9:
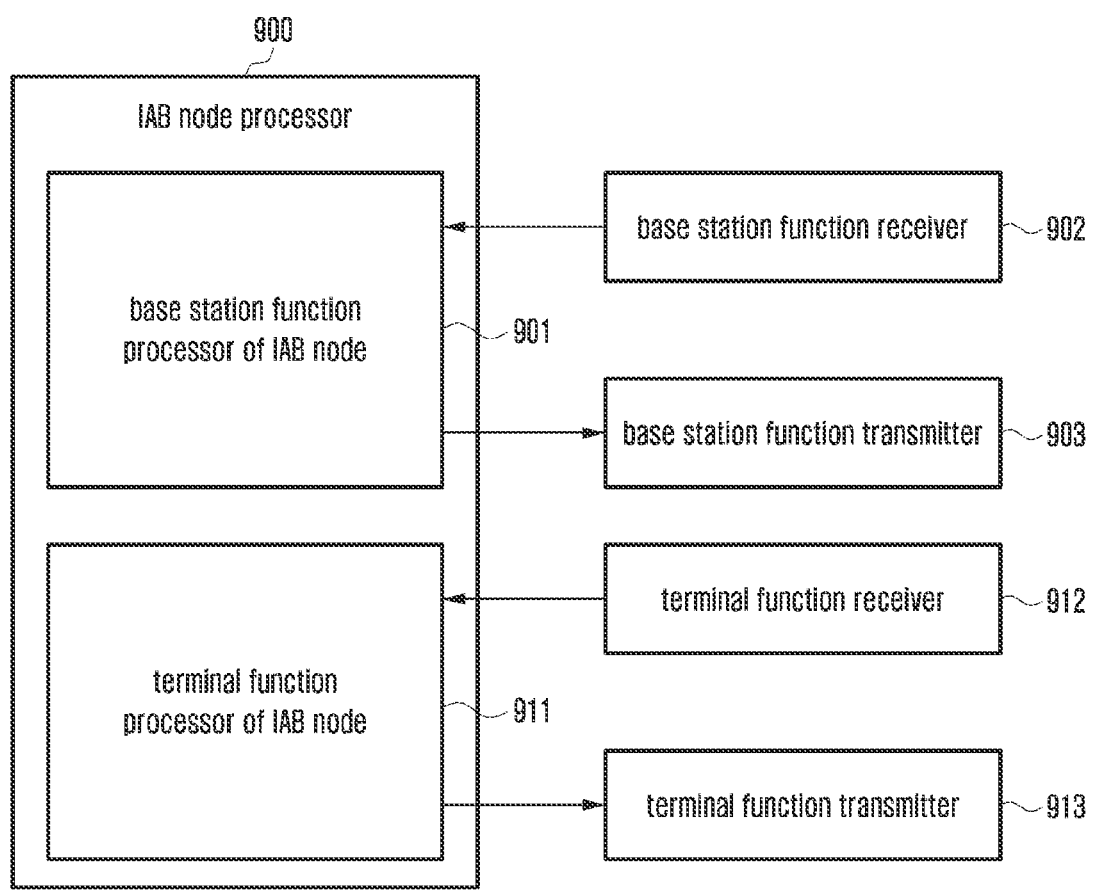
FIG. 9 is a view illustrating an apparatus of an IAB node, according to an embodiment.

In order to perform the above embodiments, FIG. 7 illustrates a transmitter, a receiver, and a controller of a terminal, and FIG. 8 illustrates a transmitter, a receiver, and a controller of a base station. In addition, FIG. 9 illustrates a device of the IAB node. When transmitting and receiving a backhaul link or an access link through an IAB node in the 5G communication system, a base station (a donor base station) that performs transmission and reception to and from an IAB node and a backhaul link through mmWave and a terminal transmission/reception method that transmits/receives an IAB node and an access link are shown.

Specifically, FIG. 7 is a block diagram illustrating the internal structure of a terminal, according to an embodiment. As shown in FIG. 7, the terminal includes a terminal controller 701, a terminal receiver 702, and a terminal transmitter 703.

The terminal controller 701 may control a series of processes in which the terminal can operate. For example, the access-link transmission and reception with the IAB node may be controlled differently. The terminal receiver 702 and the terminal transmitter 703 may be collectively referred to as a transceiver. The transceiver may transmit and receive signals with the base station. The signals may include control information and data. To this end, the transceiver may include an RF transmitter that up-converts and amplifies the frequency of a transmitted signal, and an RF receiver that amplifies the received signal with low noise and down-converts a frequency. In addition, the transceiver may receive a signal through a wireless channel, output the same to the terminal controller 701, and transmit a signal output from the terminal controller 701 through a wireless channel.

FIG. 8 is a block diagram illustrating the internal structure of a base station (a donor base station), according to an embodiment. As shown in FIG. 8, the base station includes a base station controller 801, a base station receiver 802, and a base station transmitter 803.

The base station controller 801 may control a series of processes so that the base station can operate. For example, the base station controller 801 may control transmission and reception of a backhaul link with an IAB node differently than transmission and reception of an access link with an IAB node. The base station receiver 802 and the base station transmitter 803 may be collectively referred to as a transceiver. The transceiver may transmit and receive signals with the terminal. The signal may include control information and data. To this end, the transceiver may include an RF transmitter that up-converts and amplifies the frequency of a transmitted signal and an RF receiver that amplifies a received signal with low noise and down-converts a frequency. In addition, the transceiver may receive a signal through a wireless channel, output the same to the base station controller 801, and transmit the signal output from the base station controller 801 through the wireless channel.

FIG. 9 is a block diagram illustrating the internal structure of an IAB node, according to an embodiment. As shown in FIG. 9, the IAB node of the disclosure includes a base station function controller 901, a base station function receiver 902, and a base station function transmitter 903 of the IAB node for performing transmission and reception to and from a lower IAB node through a backhaul link. The base station function controller 901, the base station function receiver 902, and the base station function transmitter 903 may be understood as DU functions or DU parts, described above.

In addition, the IAB node may include a terminal function controller of the IAB node, a terminal function receiver 912, and a terminal function transmitter 913 for initially accessing the upper IAB node and the donor base station, transmitting and receiving the upper signal before transmission and reception through the backhaul link, and transmitting and receiving the backhaul link with the upper IAB node and the donor base station. The terminal function controller 911, the terminal function receiver 912, and the terminal function transmitter 913 may be understood as the MT function or MT part, described above.

The base station function controller 901 of the IAB node may control a series of processes so that the IAB node may operate like a base station. For example, the base station function controller 901 may perform the function of the DU of the IAB node, described above. The base station function controller 901 may control transmission and reception of a backhaul link with a lower IAB node differently than transmission and reception of an access link with a terminal. The base station function receiver 902 and the base station function transmitter 903 may be collectively referred to as a transceiver. The transceiver may transmit and receive signals with lower IAB nodes and terminals. The signals may include control information and data. To this end, the transceiver may include an RF transmitter that up-converts and amplifies the frequency of a transmitted signal and an RF receiver that amplifies a received signal with low noise and down-converts a frequency. In addition, the transceiver may receive a signal through a wireless channel, output the same to the base station function controller 901, and transmit the signal output from the base station function controller 901 through the wireless channel.

The terminal function controller 911 of the IAB node may control a series of processes in which a lower IAB node can operate like a terminal to transmit and receive data with a donor base station or an upper IAB node, and may perform the MT function of the IAB node described above. For example, the terminal function controller 911 may control transmission and reception of a backhaul link with a donor base station and an upper IAB node. The terminal function receiver 912 and the terminal function transmitter 913 may be collectively referred to as a transceiver. The transceiver may transmit and receive signals with the donor base station and the upper IAB node. The signal may include control information and data. To this end, the transceiver may include an RF transmitter that up-converts and amplifies the frequency of a transmitted signal and an RF receiver that amplifies a received signal with low noise and down-converts a frequency. In addition, the transceiver may receive a signal through a wireless channel, output the same to the terminal function controller 911, and transmit a signal output from the terminal function controller 911 through the wireless channel.

The base station function controller 901 of the IAB node included in the IAB node of FIG. 9 and the terminal function controller 911 of the IAB node may be integrated with each other to be implemented as the IAB node controller 900. In this case, the IAB node controller 900 may control the functions of the DU and the MT together in the IAB node.

While the present disclosure has been particularly shown and described with reference to certain embodiments thereof, it will be understood by those of ordinary skill in the art that various changes in form and details may be made therein without departing from the spirit and scope of the disclosure as defined by the appended claims and their equivalents.

What is claimed is:

1. A method performed by an integrated access and backhaul (IAB) node including a distributed unit (DU) and a mobile termination (MT) in a communication system, the method comprising:
   receiving, by the MT, downlink control information (DCI) for identifying a slot format from at least one slot format; and
   communicating, by the MT, in a slot based on the slot format,
   wherein one slot includes 14 orthogonal frequency division multiplexing (OFDM) symbols with indexes from 0 to 13,
   wherein the at least one slot format is associated with a first set of slot formats and a second set of slot formats,
   wherein the first set of slot formats is defined by a first table below:

| | | | | | symbol index in one slot | | | | | | | | |
|---|---|---|---|---|---|---|---|---|---|---|---|---|---|
| 0 | 1 | 2 | 3 | 4 | 5 | 6 | 7 | 8 | 9 | 10 | 11 | 12 | 13 |
| D | D | D | D | D | D | D | D | D | D | D | D | D | D |
| U | U | U | U | U | U | U | U | U | U | U | U | U | U |
| F | F | F | F | F | F | F | F | F | F | F | F | F | F |
| D | D | D | D | D | D | D | D | D | D | D | D | D | F |
| D | D | D | D | D | D | D | D | D | D | D | D | F | F |
| D | D | D | D | D | D | D | D | D | D | D | F | F | F |
| D | D | D | D | D | D | D | D | D | D | F | F | F | F |
| D | D | D | D | D | D | D | D | D | F | F | F | F | F |
| F | F | F | F | F | F | F | F | F | F | F | F | F | U |
| F | F | F | F | F | F | F | F | F | F | F | F | U | U |
| F | U | U | U | U | U | U | U | U | U | U | U | U | U |
| F | F | U | U | U | U | U | U | U | U | U | U | U | U |
| F | F | F | U | U | U | U | U | U | U | U | U | U | U |
| F | F | F | F | U | U | U | U | U | U | U | U | U | U |
| F | F | F | F | F | U | U | U | U | U | U | U | U | U |
| F | F | F | F | F | F | U | U | U | U | U | U | U | U |
| D | F | F | F | F | F | F | F | F | F | F | F | F | F |
| D | D | F | F | F | F | F | F | F | F | F | F | F | F |
| D | D | D | F | F | F | F | F | F | F | F | F | F | F |
| D | F | F | F | F | F | F | F | F | F | F | F | F | U |
| D | D | F | F | F | F | F | F | F | F | F | F | F | U |
| D | D | D | F | F | F | F | F | F | F | F | F | F | U |
| D | F | F | F | F | F | F | F | F | F | F | F | U | U |
| D | D | F | F | F | F | F | F | F | F | F | F | U | U |
| D | D | D | F | F | F | F | F | F | F | F | F | U | U |
| D | F | F | F | F | F | F | F | F | F | F | U | U | U |
| D | D | F | F | F | F | F | F | F | F | F | U | U | U |
| D | D | D | F | F | F | F | F | F | F | F | U | U | U |
| D | D | D | D | D | D | D | D | D | D | D | D | F | U |
| D | D | D | D | D | D | D | D | D | D | D | F | F | U |
| D | D | D | D | D | D | D | D | D | D | F | F | F | U |
| D | D | D | D | D | D | D | D | D | D | D | F | U | U |
| D | D | D | D | D | D | D | D | D | D | F | F | U | U |
| D | D | D | D | D | D | D | D | D | F | F | F | U | U |
| D | F | U | U | U | U | U | U | U | U | U | U | U | U |
| D | D | F | U | U | U | U | U | U | U | U | U | U | U |
| D | D | D | F | U | U | U | U | U | U | U | U | U | U |
| D | F | F | U | U | U | U | U | U | U | U | U | U | U |
| D | D | F | F | U | U | U | U | U | U | U | U | U | U |
| D | D | D | F | F | U | U | U | U | U | U | U | U | U |
| D | F | F | F | U | U | U | U | U | U | U | U | U | U |
| D | D | F | F | F | U | U | U | U | U | U | U | U | U |
| D | D | D | F | F | F | U | U | U | U | U | U | U | U |
| D | D | D | D | D | D | D | D | D | F | F | F | F | U |
| D | D | D | D | D | D | F | F | F | F | F | F | U | U |
| D | D | D | D | D | F | F | U | D | D | D | D | F | U |
| D | D | F | U | U | U | U | D | D | F | U | U | U | U |
| D | F | U | U | U | U | U | D | F | U | U | U | U | U |
| D | D | D | D | F | F | U | U | D | D | D | D | F | U |
| D | F | U | U | U | U | U | D | F | U | U | U | U | U |
| D | D | F | U | U | U | U | D | D | F | U | U | U | U |
| D | F | F | U | U | U | U | D | F | F | U | U | U | U |
| D | D | F | F | U | U | U | D | D | F | F | U | U | U |
| D | F | F | F | U | U | U | D | F | F | F | U | U | U |
| D | D | D | F | F | U | U | D | D | D | F | F | U | U |
| D | D | F | F | U | U | U | D | D | F | F | U | U | U |

-continued

| symbol index in one slot | | | | | | | | | | | | | |
|---|---|---|---|---|---|---|---|---|---|---|---|---|---|
| 0 | 1 | 2 | 3 | 4 | 5 | 6 | 7 | 8 | 9 | 10 | 11 | 12 | 13 |
| D | F | F | U | U | U | D | F | F | U | U | U | U | U |
| D | F | F | F | F | F | U | D | F | F | F | F | F | U |
| D | D | F | F | F | F | U | D | D | F | F | F | F | U |
| F | F | F | F | F | F | F | D | D | D | D | D | D | D |
| D | D | F | F | F | U | U | U | D | D | D | D | D | D | wherein the second set of slot formats is defined by a second table below:

| symbol index in one slot | | | | | | | | | | | | | |
|---|---|---|---|---|---|---|---|---|---|---|---|---|---|
| 0 | 1 | 2 | 3 | 4 | 5 | 6 | 7 | 8 | 9 | 10 | 11 | 12 | 13 |
| U | F | F | F | F | F | F | F | F | F | F | F | F | D |
| U | U | F | F | F | F | F | F | F | F | F | F | F | D |
| U | U | U | F | F | F | F | F | F | F | F | F | F | D |
| U | F | F | F | F | F | F | F | F | F | F | F | D | D |
| U | U | F | F | F | F | F | F | F | F | F | F | D | D |
| U | U | U | F | F | F | F | F | F | F | F | F | D | D |
| U | F | F | F | F | F | F | F | F | F | F | D | D | D |
| U | U | F | F | F | F | F | F | F | F | F | D | D | D |
| U | U | U | F | F | F | F | F | F | F | F | D | D | D |
| U | U | U | U | U | U | U | U | U | U | U | F | F | D |
| U | U | U | U | U | U | U | U | U | U | F | F | F | D |
| U | U | U | U | U | U | U | U | U | F | F | F | F | D |
| U | U | U | U | U | U | U | U | F | F | F | F | D | D |
| U | U | U | U | U | U | U | F | F | F | F | D | D | D |
| U | F | D | D | D | D | D | D | D | D | D | D | D | D |
| U | U | F | D | D | D | D | D | D | D | D | D | D | D |
| U | U | U | F | D | D | D | D | D | D | D | D | D | D |
| U | F | F | D | D | D | D | D | D | D | D | D | D | D |
| U | U | F | F | D | D | D | D | D | D | D | D | D | D |
| U | U | U | F | F | D | D | D | D | D | D | D | D | D |
| U | F | F | F | D | D | D | D | D | D | D | D | D | D |
| U | U | F | F | F | D | D | D | D | D | D | D | D | D |
| U | U | U | F | F | F | D | D | D | D | D | D | D | D |
| U | U | U | U | U | U | U | F | F | F | F | F | F | D |
| U | U | U | U | U | U | F | F | F | F | F | F | D | D |
| U | U | U | U | U | F | F | D | D | D | D | D | D | D | wherein, in the first table and the second table, D is a downlink symbol, U is an uplink symbol, and F is a flexible symbol, wherein, for a certain symbol which is configured as a soft type, the DU performs communication in the certain symbol in case that the MT does not perform communication in the certain symbol, and wherein the certain symbol is one of the downlink symbol, the uplink symbol, or the flexible symbol.

2. The method of claim 1, wherein the MT and the DU are respectively configured with their own slot format, and wherein a slot format for the DU is configured via F1 application protocol (FLAP) signaling.

3. The method of claim 1, wherein the certain symbol is configured as the soft type based on information indicating the soft type being received by the DU via FLAP signaling.

4. A method performed by a base station in a communication system, the method comprising:

obtaining a slot format from at least one slot format for a mobile termination (MT) of an integrated access and backhaul (IAB) node; and transmitting, to the IAB node, downlink control information (DCI) including information on the slot format, wherein one slot includes 14 orthogonal frequency division multiplexing (OFDM) symbols with indexes from 0 to 13, wherein the at least one slot format is associated with a first set of slot formats and a second set of slot formats, wherein the first set of slot formats is defined by a first table below:

| symbol index in one slot | | | | | | | | | | | | | |
|---|---|---|---|---|---|---|---|---|---|---|---|---|---|
| 0 | 1 | 2 | 3 | 4 | 5 | 6 | 7 | 8 | 9 | 10 | 11 | 12 | 13 |
| D | D | D | D | D | D | D | D | D | D | D | D | D | D |
| U | U | U | U | U | U | U | U | U | U | U | U | U | U |
| F | F | F | F | F | F | F | F | F | F | F | F | F | F |
| D | D | D | D | D | D | D | D | D | D | D | D | D | F |
| D | D | D | D | D | D | D | D | D | D | D | D | F | F |
| D | D | D | D | D | D | D | D | D | D | D | F | F | F |
| D | D | D | D | D | D | D | D | D | F | F | F | F | F |
| D | D | D | D | D | D | D | F | F | F | F | F | F | U |
| F | F | F | F | F | F | F | F | F | F | F | F | F | U |
| F | F | F | F | F | F | F | F | F | F | F | F | U | U |
| F | U | U | U | U | U | U | U | U | U | U | U | U | U |
| F | F | U | U | U | U | U | U | U | U | U | U | U | U |
| F | F | F | U | U | U | U | U | U | U | U | U | U | U |
| F | F | F | F | U | U | U | U | U | U | U | U | U | U |
| F | F | F | F | F | U | U | U | U | U | U | U | U | U |
| F | F | F | F | F | F | U | U | U | U | U | U | U | U |
| D | F | F | F | F | F | F | F | F | F | F | F | F | F |
| D | D | F | F | F | F | F | F | F | F | F | F | F | F |
| D | D | D | F | F | F | F | F | F | F | F | F | F | F |
| D | F | F | F | F | F | F | F | F | F | F | F | F | U |
| D | D | F | F | F | F | F | F | F | F | F | F | F | U |
| D | D | D | F | F | F | F | F | F | F | F | F | F | U |
| D | F | F | F | F | F | F | F | F | F | F | F | U | U |
| D | D | F | F | F | F | F | F | F | F | F | F | U | U |
| D | D | D | F | F | F | F | F | F | F | F | F | U | U |
| D | F | F | F | F | F | F | F | F | F | F | U | U | U |
| D | D | F | F | F | F | F | F | F | F | F | U | U | U |
| D | D | D | F | F | F | F | F | F | F | F | U | U | U |
| D | D | D | D | D | D | D | D | D | D | D | D | F | U |
| D | D | D | D | D | D | D | D | D | D | D | F | F | U |
| D | D | D | D | D | D | D | D | D | D | F | F | F | U |
| D | D | D | D | D | D | D | D | D | F | F | F | F | U |
| D | D | D | D | D | D | D | D | D | D | F | U | U | U |
| D | D | D | D | D | D | D | D | D | F | F | U | U | U |
| D | D | D | D | D | D | D | D | F | F | F | U | U | U |
| D | F | U | U | U | U | U | U | U | U | U | U | U | U |
| D | D | F | U | U | U | U | U | U | U | U | U | U | U |
| D | D | D | F | U | U | U | U | U | U | U | U | U | U |
| D | F | U | U | U | U | U | U | U | U | U | U | U | U |
| D | F | F | U | U | U | U | U | U | U | U | U | U | U |
| D | D | F | U | U | U | U | U | U | U | U | U | U | U |
| D | F | F | F | U | U | U | U | U | U | U | U | U | U |
| D | D | F | F | U | U | U | U | U | U | U | U | U | U |
| D | D | D | F | F | U | U | U | U | U | U | U | U | U |
| D | D | D | D | D | D | D | F | F | F | F | F | F | U |
| D | D | D | D | D | F | F | F | F | F | F | F | U | U |
| D | D | D | D | D | F | F | D | D | D | D | D | F | U |
| D | D | D | F | U | D | D | D | D | D | D | D | F | U |
| D | D | F | U | U | D | D | F | D | F | U | U | U | U |
| D | F | U | U | U | U | D | F | U | U | U | U | U | U |
| D | D | D | F | F | U | D | D | D | F | F | U | U | U |
| D | D | F | U | U | U | D | D | F | U | U | U | U | U |
| D | F | U | U | U | U | D | F | U | U | U | U | U | U |
| D | F | F | F | F | U | D | F | F | F | F | F | F | U |
| D | D | F | F | F | U | D | D | F | F | F | F | F | U |
| F | F | F | F | F | U | D | D | D | D | D | D | D | D |
| D | D | F | F | U | U | D | D | D | D | D | D | D | D | wherein the second set of slot formats is defined by a second table below:

| symbol index in one slot | | | | | | | | | | | | | |
|---|---|---|---|---|---|---|---|---|---|---|---|---|---|
| 0 | 1 | 2 | 3 | 4 | 5 | 6 | 7 | 8 | 9 | 10 | 11 | 12 | 13 |
| U | F | F | F | F | F | F | F | F | F | F | F | F | D |
| U | U | F | F | F | F | F | F | F | F | F | F | F | D |
| U | U | U | F | F | F | F | F | F | F | F | F | F | D |
| U | F | F | F | F | F | F | F | F | F | F | F | D | D |

-continued

| | | | | | symbol index in one slot | | | | | | | | |
|---|---|---|---|---|---|---|---|---|---|---|---|---|---|
| 0 | 1 | 2 | 3 | 4 | 5 | 6 | 7 | 8 | 9 | 10 | 11 | 12 | 13 |
| U | U | F | F | F | F | F | F | F | F | F | F | D | D |
| U | U | U | F | F | F | F | F | F | F | F | F | D | D |
| U | F | F | F | F | F | F | F | F | F | F | D | D | D |
| U | U | F | F | F | F | F | F | F | F | F | D | D | D |
| U | U | U | F | F | F | F | F | F | F | F | D | D | D |
| U | U | U | U | U | U | U | U | U | U | U | U | F | D |
| U | U | U | U | U | U | U | U | U | U | U | F | F | D |
| U | U | U | U | U | U | U | U | U | U | F | F | F | D |
| U | U | U | U | U | U | U | U | U | U | U | F | D | D |
| U | U | U | U | U | U | U | U | F | F | F | F | D | D |
| U | F | D | D | D | D | D | D | D | D | D | D | D | D |
| U | U | F | D | D | D | D | D | D | D | D | D | D | D |
| U | U | U | F | D | D | D | D | D | D | D | D | D | D |
| U | F | F | D | D | D | D | D | D | D | D | D | D | D |
| U | U | F | F | D | D | D | D | D | D | D | D | D | D |
| U | U | U | F | F | D | D | D | D | D | D | D | D | D |
| U | F | F | F | D | D | D | D | D | D | D | D | D | D |
| U | U | F | F | F | D | D | D | D | D | D | D | D | D |
| U | U | U | F | F | F | D | D | D | D | D | D | D | D |
| U | U | U | U | U | U | U | U | F | F | F | F | F | D |
| U | U | U | U | U | F | F | F | F | F | F | D | D | D |
| U | U | U | U | U | F | F | D | D | D | D | D | D | D | wherein, in the first table and the second table, D is a downlink symbol, U is an uplink symbol, and F is a flexible symbol, wherein, for a certain symbol which is configured as soft type, communication in the certain symbol for the DU of the IAB node is available in case that communication in the certain symbol for the MT has not occurred, and wherein the certain symbol is one of the downlink symbol, the uplink symbol, or the flexible symbol.

5. The method of claim 4, further comprising transmitting information on a slot format for the DU via F1 application protocol (F1AP) signaling.

6. The method of claim 4, further comprising transmitting, to the DU, information indicating the soft type to configure the certain symbol as the soft type via F1AP signaling.

7. An integrated access and backhaul (IAB) node including a distributed unit (DU) and a mobile termination (MT) in a communication system, the IAB node comprising:
- a transceiver; and
- a processor coupled with the transceiver and configured to:
  - receive, by the MT, downlink control information (DCI) for identifying a slot format from at least one slot format; and
  - communicate, by the MT, in a slot based on the slot format,
- wherein one slot includes 14 orthogonal frequency division multiplexing (OFDM) symbols with indexes from 0 to 13,
- wherein the at least one slot format is associated with a first set of slot formats and a second set of slot formats,
- wherein the first set of slot formats is defined by a first table below:

| | | | | | symbol index in one slot | | | | | | | | |
|---|---|---|---|---|---|---|---|---|---|---|---|---|---|
| 0 | 1 | 2 | 3 | 4 | 5 | 6 | 7 | 8 | 9 | 10 | 11 | 12 | 13 |
| D | D | D | D | D | D | D | D | D | D | D | D | D | D |
| U | U | U | U | U | U | U | U | U | U | U | U | U | U |

-continued

| | | | | | symbol index in one slot | | | | | | | | |
|---|---|---|---|---|---|---|---|---|---|---|---|---|---|
| 0 | 1 | 2 | 3 | 4 | 5 | 6 | 7 | 8 | 9 | 10 | 11 | 12 | 13 |
| F | F | F | F | F | F | F | F | F | F | F | F | F | F |
| D | D | D | D | D | D | D | D | D | D | D | D | D | F |
| D | D | D | D | D | D | D | D | D | D | D | D | F | F |
| D | D | D | D | D | D | D | D | D | D | D | F | F | F |
| D | D | D | D | D | D | D | D | D | D | F | F | F | F |
| D | D | D | D | D | D | D | D | D | F | F | F | F | F |
| F | F | F | F | F | F | F | F | F | F | F | F | F | U |
| F | F | F | F | F | F | F | F | F | F | F | F | U | U |
| F | U | U | U | U | U | U | U | U | U | U | U | U | U |
| F | F | U | U | U | U | U | U | U | U | U | U | U | U |
| F | F | F | U | U | U | U | U | U | U | U | U | U | U |
| F | F | F | F | U | U | U | U | U | U | U | U | U | U |
| F | F | F | F | F | U | U | U | U | U | U | U | U | U |
| D | F | F | F | F | F | F | F | F | F | F | F | F | F |
| D | D | F | F | F | F | F | F | F | F | F | F | F | F |
| D | D | D | F | F | F | F | F | F | F | F | F | F | F |
| D | F | F | F | F | F | F | F | F | F | F | F | F | U |
| D | D | F | F | F | F | F | F | F | F | F | F | F | U |
| D | D | D | F | F | F | F | F | F | F | F | F | F | U |
| D | F | F | F | F | F | F | F | F | F | F | F | U | U |
| D | D | F | F | F | F | F | F | F | F | F | F | U | U |
| D | D | D | F | F | F | F | F | F | F | F | F | U | U |
| D | F | F | F | F | F | F | F | F | F | F | U | U | U |
| D | D | F | F | F | F | F | F | F | F | F | U | U | U |
| D | D | D | F | F | F | F | F | F | F | F | U | U | U |
| D | D | D | D | D | D | D | D | D | D | D | D | F | U |
| D | D | D | D | D | D | D | D | D | D | D | F | F | U |
| D | D | D | D | D | D | D | D | D | D | F | F | F | U |
| D | D | D | D | D | D | D | D | D | F | F | F | F | U |
| D | D | D | D | D | D | D | D | F | F | F | F | F | U |
| D | D | D | D | D | D | D | F | F | F | F | F | F | U |
| D | F | U | U | U | U | U | U | U | U | U | U | U | U |
| D | D | F | U | U | U | U | U | U | U | U | U | U | U |
| D | D | D | F | U | U | U | U | U | U | U | U | U | U |
| D | F | F | U | U | U | U | U | U | U | U | U | U | U |
| D | D | F | F | U | U | U | U | U | U | U | U | U | U |
| D | D | D | F | F | U | U | U | U | U | U | U | U | U |
| D | D | D | D | F | U | U | U | U | U | U | U | U | U |
| D | D | D | D | D | F | U | U | U | U | U | U | U | U |
| D | F | F | U | U | U | U | U | U | U | U | U | U | U |
| D | D | F | F | U | U | U | U | U | U | U | U | U | U |
| D | D | D | F | F | U | U | U | U | U | U | U | U | U |
| D | D | D | D | F | F | U | U | U | U | U | U | U | U |
| D | D | D | D | D | D | D | F | F | F | F | F | F | U |
| D | D | D | D | D | F | F | F | F | F | F | U | U | U |
| D | D | D | D | F | F | U | U | U | U | U | U | F | U |
| D | D | F | U | U | U | U | D | D | F | U | U | U | U |
| D | F | U | U | U | U | U | D | F | U | U | U | U | U |
| D | D | D | D | F | U | D | D | D | D | F | U | U | U |
| D | F | U | U | U | U | U | D | F | U | U | U | U | U |
| D | D | F | U | U | U | U | D | D | F | U | U | U | U |
| D | D | D | F | U | U | U | D | D | D | F | U | U | U |
| D | F | F | U | U | U | D | D | F | F | U | U | U | U |
| D | F | F | F | F | F | U | D | F | F | F | F | F | U |
| D | D | F | F | F | F | U | D | D | F | F | F | F | U |
| F | F | F | F | F | F | D | D | D | D | D | D | D | D |
| D | D | F | F | F | U | U | U | D | D | D | D | D | D | wherein the second set of slot formats is defined by a second table below:

| | | | | | symbol index in one slot | | | | | | | | |
|---|---|---|---|---|---|---|---|---|---|---|---|---|---|
| 0 | 1 | 2 | 3 | 4 | 5 | 6 | 7 | 8 | 9 | 10 | 11 | 12 | 13 |
| U | F | F | F | F | F | F | F | F | F | F | F | F | D |
| U | U | F | F | F | F | F | F | F | F | F | F | F | D |
| U | U | U | F | F | F | F | F | F | F | F | F | F | D |
| U | F | F | F | F | F | F | F | F | F | F | F | D | D |
| U | U | F | F | F | F | F | F | F | F | F | F | D | D |
| U | U | U | F | F | F | F | F | F | F | F | F | D | D |
| U | F | F | F | F | F | F | F | F | F | F | D | D | D |
| U | U | F | F | F | F | F | F | F | F | F | D | D | D |
| U | U | U | F | F | F | F | F | F | F | F | D | D | D |
| U | U | U | U | U | U | U | U | U | U | U | U | F | D |
| U | U | U | U | U | U | U | U | U | U | U | F | F | D |

| symbol index in one slot | | | | | | | | | | | | | |
|---|---|---|---|---|---|---|---|---|---|---|---|---|---|
| 0 | 1 | 2 | 3 | 4 | 5 | 6 | 7 | 8 | 9 | 10 | 11 | 12 | 13 |
| U | U | U | U | U | U | U | U | U | F | F | F | D | |
| U | U | U | U | U | U | U | U | U | U | F | D | D | |
| U | U | U | U | U | U | U | U | U | F | F | D | D | |
| U | U | U | U | U | U | U | U | F | F | F | D | D | |
| U | F | D | D | D | D | D | D | D | D | D | D | D | |
| U | U | F | D | D | D | D | D | D | D | D | D | D | |
| U | U | U | F | D | D | D | D | D | D | D | D | D | |
| U | F | F | D | D | D | D | D | D | D | D | D | D | |
| U | U | F | F | D | D | D | D | D | D | D | D | D | |
| U | U | U | F | F | D | D | D | D | D | D | D | D | |
| U | F | F | F | D | D | D | D | D | D | D | D | D | |
| U | U | F | F | F | D | D | D | D | D | D | D | D | |
| U | U | U | F | F | F | D | D | D | D | D | D | D | |
| U | U | U | U | U | U | U | U | F | F | F | F | D | |
| U | U | U | U | U | F | F | F | F | F | F | D | D | |
| U | U | U | U | U | F | F | D | D | D | D | D | D | | wherein, in the first table and the second table, D is a downlink symbol, U is an uplink symbol, and F is a flexible symbol, wherein, for a certain symbol which is configured as a soft type, the DU performs communication in the certain symbol in case that the MT does not perform communication in the certain symbol, and wherein the certain symbol is one of the downlink symbol, the uplink symbol, or the flexible symbol.

8. The IAB node of claim 7, wherein the MT and the DU are respectively configured with their own slot format, and wherein a slot format for the DU is configured via F1 application protocol (FLAP) signaling.

9. The IAB node of claim 7, wherein the certain symbol is configured as the soft type based on information indicating the soft type being received by the DU via FLAP signaling.

10. A base station in a communication system, the base station comprising:

a transceiver; and a processor coupled with the transceiver and configured to:

obtain a slot format from at least one slot format for a mobile termination (MT) of an integrated access and backhaul (IAB) node; and transmit, to the IAB node, downlink control information (DCI) including information on the slot format, wherein one slot includes 14 orthogonal frequency division multiplexing (OFDM) symbols with indexes from 0 to 13, wherein the at least one slot format is associated with a first set of slot formats and a second set of slot formats, wherein the first set of slot formats is defined by a first table below:

| symbol index in one slot | | | | | | | | | | | | | |
|---|---|---|---|---|---|---|---|---|---|---|---|---|---|
| 0 | 1 | 2 | 3 | 4 | 5 | 6 | 7 | 8 | 9 | 10 | 11 | 12 | 13 |
| D | D | D | D | D | D | D | D | D | D | D | D | D | D |
| U | U | U | U | U | U | U | U | U | U | U | U | U | U |
| F | F | F | F | F | F | F | F | F | F | F | F | F | F |
| D | D | D | D | D | D | D | D | D | D | D | D | D | F |
| D | D | D | D | D | D | D | D | D | D | D | D | F | F |
| D | D | D | D | D | D | D | D | D | D | D | F | F | F |
| D | D | D | D | D | D | D | D | D | D | F | F | F | F |
| D | D | D | D | D | D | D | D | D | F | F | F | F | F |
| D | D | D | D | D | D | D | D | F | F | F | F | F | F |
| F | F | F | F | F | F | F | F | F | F | F | F | F | U | wherein the second set of slot formats is defined by a second table below:

| symbol index in one slot | | | | | | | | | | | | | |
|---|---|---|---|---|---|---|---|---|---|---|---|---|---|
| 0 | 1 | 2 | 3 | 4 | 5 | 6 | 7 | 8 | 9 | 10 | 11 | 12 | 13 |
| F | F | F | F | F | F | F | F | F | F | F | F | U | U |
| F | U | U | U | U | U | U | U | U | U | U | U | U | U |
| F | F | U | U | U | U | U | U | U | U | U | U | U | U |
| F | F | F | U | U | U | U | U | U | U | U | U | U | U |
| F | F | F | F | U | U | U | U | U | U | U | U | U | U |
| F | F | F | F | F | U | U | U | U | U | U | U | U | U |
| F | F | F | F | F | F | U | U | U | U | U | U | U | U |
| D | F | F | F | F | F | F | F | F | F | F | F | F | F |
| D | D | F | F | F | F | F | F | F | F | F | F | F | F |
| D | D | D | F | F | F | F | F | F | F | F | F | F | F |
| D | F | F | F | F | F | F | F | F | F | F | F | F | U |
| D | D | F | F | F | F | F | F | F | F | F | F | F | U |
| D | D | D | F | F | F | F | F | F | F | F | F | F | U |
| D | F | F | F | F | F | F | F | F | F | F | U | U | U |
| D | D | F | F | F | F | F | F | F | F | F | U | U | U |
| D | D | D | F | F | F | F | F | F | F | F | U | U | U |
| D | F | F | F | F | F | F | F | F | F | U | U | U | U |
| D | D | F | F | F | F | F | F | F | F | U | U | U | U |
| D | D | D | F | F | F | F | F | F | F | U | U | U | U |
| D | D | D | D | D | D | D | D | D | D | D | F | F | U |
| D | D | D | D | D | D | D | D | D | D | F | F | F | U |
| D | D | D | D | D | D | D | D | D | F | F | F | F | U |
| D | D | D | D | D | D | D | D | F | F | F | F | F | U |
| D | D | D | D | D | D | D | F | F | F | F | F | F | U |
| D | F | U | U | U | U | U | U | U | U | U | U | U | U |
| D | D | F | U | U | U | U | U | U | U | U | U | U | U |
| D | F | F | U | U | U | U | U | U | U | U | U | U | U |
| D | D | F | F | U | U | U | U | U | U | U | U | U | U |
| D | D | D | F | F | U | U | U | U | U | U | U | U | U |
| D | F | F | F | U | U | U | U | U | U | U | U | U | U |
| D | D | D | D | F | U | U | U | U | U | U | U | U | U |
| D | D | D | D | D | D | D | F | F | F | F | U | U | U |
| D | D | D | D | D | F | F | F | F | F | F | U | U | U |
| D | D | D | D | D | F | F | U | U | U | U | U | U | U |
| D | D | D | D | F | U | D | D | D | D | D | F | D | U |
| D | F | U | U | U | U | D | F | U | U | U | U | U | U |
| D | D | F | U | U | U | D | D | F | U | U | U | U | U |
| D | D | D | F | U | U | D | D | D | F | U | U | U | U |
| D | D | F | F | U | U | D | F | F | U | U | U | U | U |
| D | F | F | F | F | U | D | F | F | F | F | U | U | U |
| D | F | F | F | F | F | D | F | F | F | F | F | U | U |
| F | F | F | F | F | F | D | D | D | D | D | D | D | D |
| D | D | F | F | F | U | U | U | D | D | D | D | D | D |

-continued

| \multicolumn{14}{c}{symbol index in one slot} | | | | | | | | | | | | | |
|---|---|---|---|---|---|---|---|---|---|---|---|---|---|
| 0 | 1 | 2 | 3 | 4 | 5 | 6 | 7 | 8 | 9 | 10 | 11 | 12 | 13 |
| U | F | F | D | D | D | D | D | D | D | D | D | D | D |
| U | U | F | F | D | D | D | D | D | D | D | D | D | D |
| U | U | U | F | F | D | D | D | D | D | D | D | D | D |
| U | F | F | F | D | D | D | D | D | D | D | D | D | D |
| U | U | F | F | F | D | D | D | D | D | D | D | D | D |
| U | U | U | F | F | F | D | D | D | D | D | D | D | D |
| U | U | U | U | U | U | U | U | F | F | F | F | F | D |
| U | U | U | U | U | U | F | F | F | F | F | F | D | D |
| U | U | U | U | U | U | F | F | D | D | D | D | D | D | wherein, in the first stable and the second stable, D is a downlink symbol, U is an uplink symbol, and F is a flexible symbol, wherein, for a certain symbol which is configured as soft type, communication in the certain symbol for a DU of the IAB node is available in case that communication in the certain symbol for the MT has not occurred, and wherein the certain symbol is one of the downlink symbol, the uplink symbol, or the flexible symbol.

11. The base station of claim 10, wherein the processor is further configured to transmit information on a slot format for the DU via F1 application protocol (F1AP) signaling.

12. The base station of claim 10, wherein the processor is further configured to transmit, to the DU, information indicating the soft type to configure the certain symbol as the soft type via F1AP signaling.

* * * * *

UNITED STATES PATENT AND TRADEMARK OFFICE
CERTIFICATE OF CORRECTION

PATENT NO. : 11,985,690 B2  
APPLICATION NO. : 18/144567  
DATED : May 14, 2024  
INVENTOR(S) : Seunghoon Choi et al.

Page 1 of 1

It is certified that error appears in the above-identified patent and that said Letters Patent is hereby corrected as shown below:

In the Claims

In Column 23, Line 54, in Claim 2:  
"application protocol (FLAP) signaling."  
Should be:  
-- application protocol (F1AP) signaling. --

In Column 23, Line 57, in Claim 3:  
"the soft type being received by the DU via FLAP signaling."  
Should be:  
-- the soft type being received by the DU via F1AP signaling. --

In Column 27, Line 32, in Claim 8:  
"application protocol (FLAP) signaling."  
Should be:  
-- application protocol (F1AP) signaling. --

In Column 27, Line 35, in Claim 9:  
"ing the soft type being received by the DU via FLAP"  
Should be:  
-- ing the soft type being received by the DU via F1AP --

Signed and Sealed this  
Eighth Day of April, 2025

Coke Morgan Stewart  
*Acting Director of the United States Patent and Trademark Office*